(12) United States Patent
Maeda et al.

(10) Patent No.: US 6,626,692 B2
(45) Date of Patent: Sep. 30, 2003

(54) INSERTION AND WITHDRAWAL CONNECTOR APPARATUS, STRUCTURE OF REMOTE CONTROLLING ENGAGEMENT AND SEPARATION THEREOF, AND CONNECTING FRAME BLOCK STRUCTURE FOR INSERTION AND WITHDRAWAL CONNECTOR APPARATUS OR THE LIKE

(75) Inventors: Toshihiko Maeda, Tachikawa (JP); Yoshinori Mizusawa, Tokyo (JP); Osamu Hashiguchi, Akishima (JP); Kazuomi Sato, Tokorozawa (JP); Hisashi Ishida, Tokyo (JP); Hiroyuki Tsuzuki, Tokyo (JP); Masahiro Yamada, Tokyo (JP); Masahiro Yamauchi, Tokyo (JP)

(73) Assignees: Japan Aviation Electronics Industry, Limited, Tokyo (JP); NEC Corporation, Tokyo (JP)

( * ) Notice: Subject to any disclaimer, the term of this patent is extended or adjusted under 35 U.S.C. 154(b) by 0 days.

(21) Appl. No.: 10/054,478

(22) Filed: Jan. 22, 2002

(65) Prior Publication Data

US 2002/0064985 A1 May 30, 2002

Related U.S. Application Data

(62) Division of application No. 09/779,231, filed on Mar. 5, 2001, which is a division of application No. 09/589,677, filed on Jun. 7, 2000, now Pat. No. 6,227,894, which is a division of application No. 09/145,844, filed on Sep. 2, 1998, now Pat. No. 6,149,447.

(30) Foreign Application Priority Data

| Sep. 10, 1997 | (JP) | 9-244975 |
| Sep. 3, 1997 | (JP) | 9-238676 |
| Sep. 3, 1997 | (JP) | 9-238704 |
| Sep. 4, 1997 | (JP) | 9-239210 |

(51) Int. Cl.$^7$ ............................ H01R 13/627
(52) U.S. Cl. ................ 439/362; 439/680; 439/953
(58) Field of Search .................. 439/362, 953, 439/680

(56) References Cited

U.S. PATENT DOCUMENTS

| 4,935,847 A | * | 6/1990 | Welsh | 439/362 |
| 5,219,301 A | * | 6/1993 | Frantz | 439/362 |
| 5,647,758 A | * | 7/1997 | Ichikawa et al. | 439/362 |
| 5,921,801 A | * | 7/1999 | O'Sullivan et al. | 439/362 |

FOREIGN PATENT DOCUMENTS

| JP | 50-107936 | 8/1975 |
| JP | 5-48236 | 6/1993 |
| JP | 6-215827 | 8/1994 |
| JP | 8-273753 | 10/1996 |

* cited by examiner

Primary Examiner—Tho D. Ta
(74) Attorney, Agent, or Firm—Michael Best & Friedrich LLC

(57) ABSTRACT

There is provided an insertion and withdrawal connector apparatus in which a plurality of connectors can move only in a range of capable of engaging and separating with and from a plurality of mating connectors within a connector receiving body. A connector receiving body (1) has a pair of parallel frames (3), a pair of frame blocks (4) positioned at both end portions, and a plurality of partition members (5). One connector (10) and one mating connector are received in each of a plurality of space portions, that is, receiving chambers partitioned by a pair of frames, a pair of frame blocks, and a plurality of partition members. Each of the partition members has a pair of lances (5f, 5g) having a spring characteristic and each of the connectors has a pair of interlocking groove portions (10g) on both side surfaces. The lance (5f) interlocks with the interlocking groove portion on one of the side surfaces in the connector, and the lance (5g) interlocks with the interlocking groove portion on the other of the side surfaces in the connector. Each of the connectors has a convex portion (10d) at an upper end portion on one of the side surfaces and at a lower end portion on the other of the side surfaces, and each of the convex portions interlocks with each of the partition members.

1 Claim, 33 Drawing Sheets

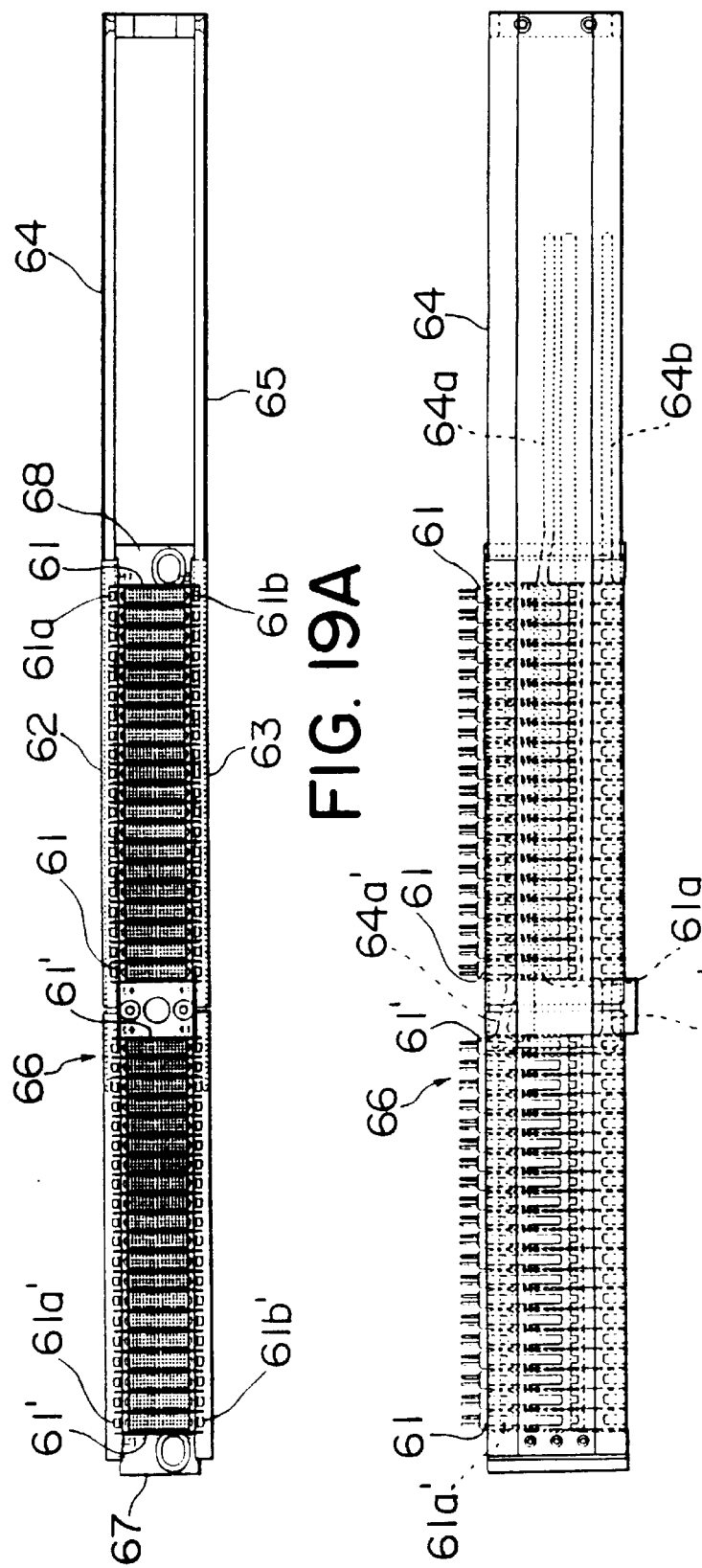

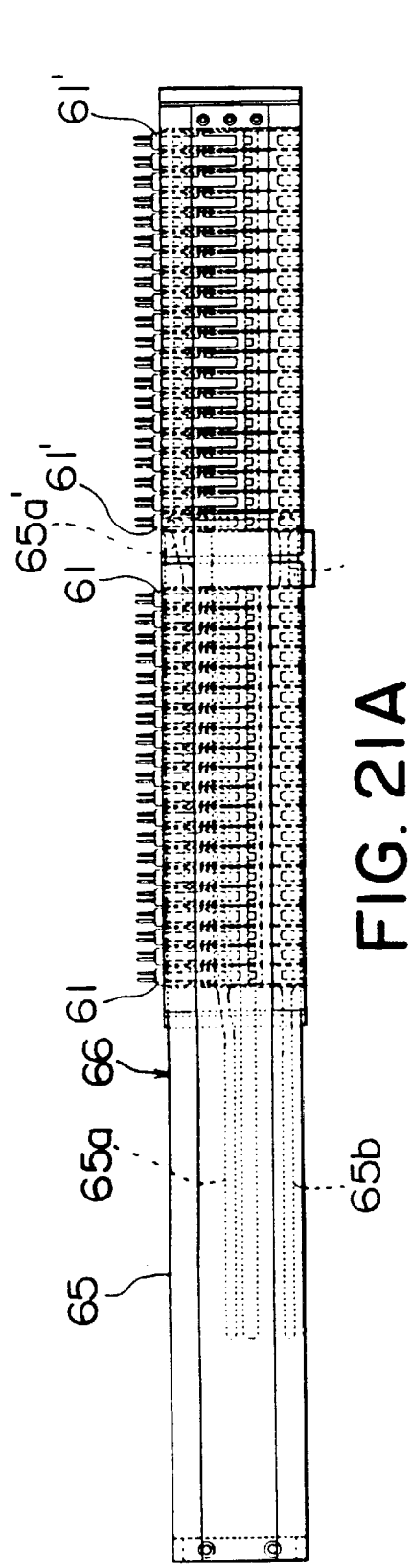
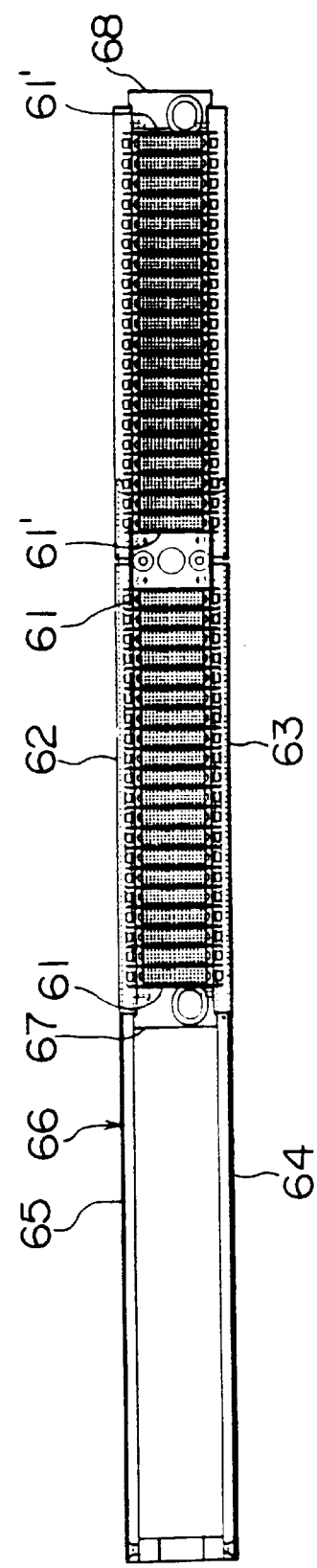
FIG. 21A
FIG. 21B

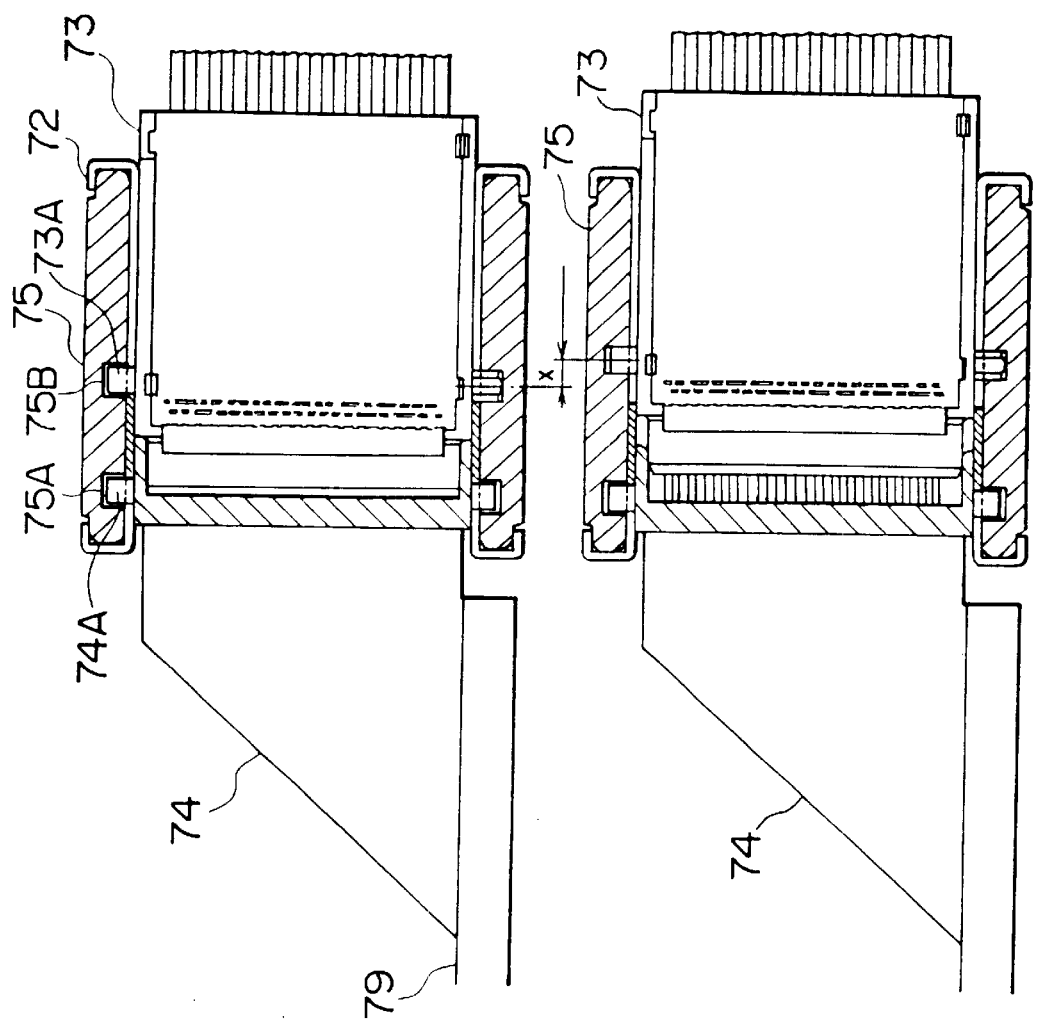

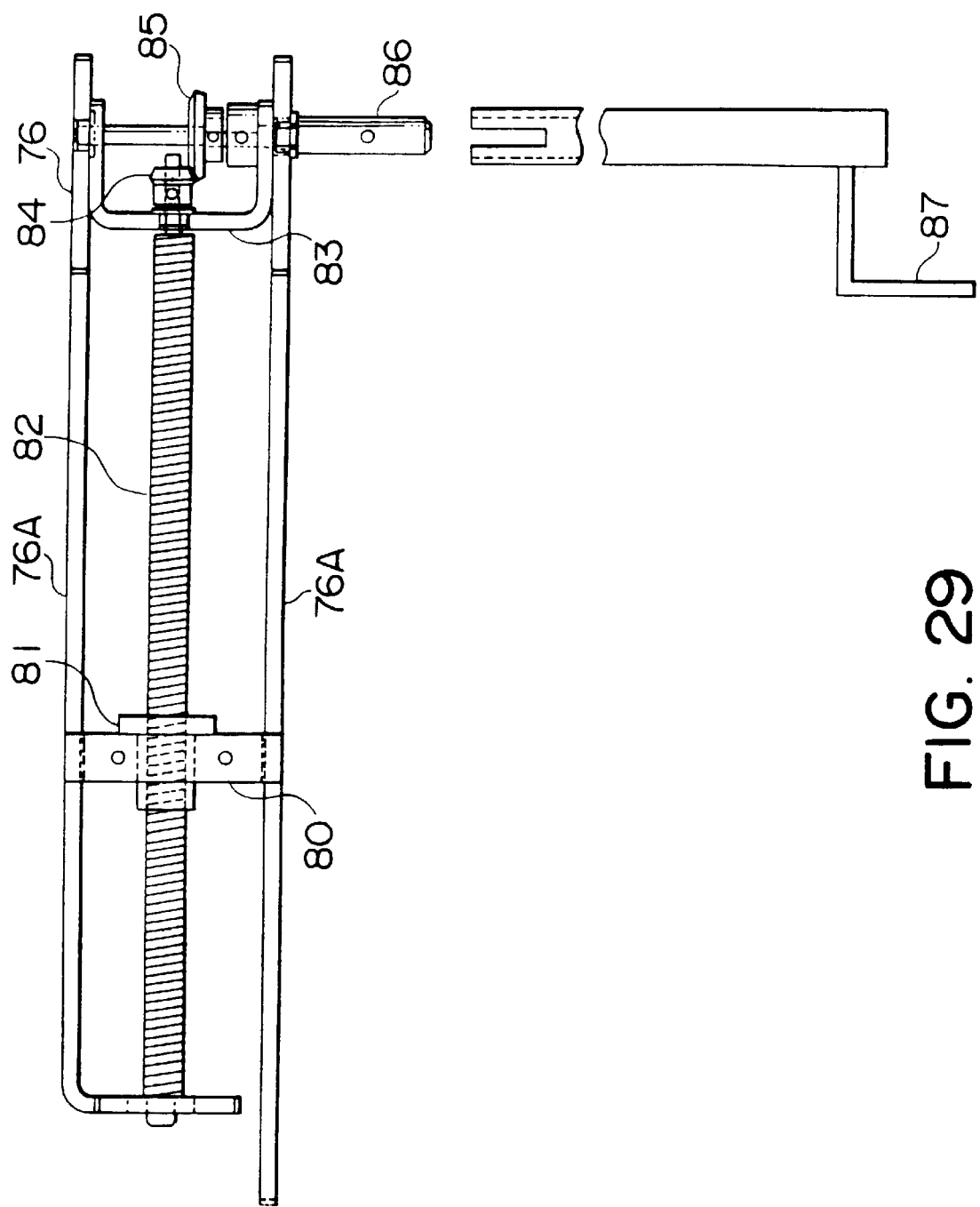

INSERTION AND WITHDRAWAL CONNECTOR APPARATUS, STRUCTURE OF REMOTE CONTROLLING ENGAGEMENT AND SEPARATION THEREOF, AND CONNECTING FRAME BLOCK STRUCTURE FOR INSERTION AND WITHDRAWAL CONNECTOR APPARATUS OR THE LIKE

This application is a Division of U.S. Ser. No. 09/779,231 filed Mar. 5, 2001; which is a Division of U.S. Ser. No. 09/589,677 filed Jun. 7, 2000 now U.S. Pat. No. 6,227,894; which is a Division of U.S. Ser. No. 09/145,844 filed Sep. 2, 1998 now U.S. Pat. No. 6,149,447.

BACKGROUND OF THE INVENTION

The present invention relates to an insertion and withdrawal connector apparatus received in a connector receiving body in such a manner that a plurality of connectors and a plurality of mating connectors can be mutually engaged with and separated from each other, and integrally combining each of the connectors so as to be used for inserting into and withdrawing from each of the mating connectors. Further, the invention relates to a structure for remote controlling an engagement and separation of the insertion and withdrawal apparatus. Still further, the invention relates to a structure for mutually connecting connecting frame blocks used for the insertion and withdrawal connector apparatus or the like.

Firstly, a first conventional art will be described below. The insertion and withdrawal connector apparatus is constituted, for example, by a plurality of connectors connected to a plurality of cables for transmitting and receiving a predetermined signal by means of mutually connecting a multiplicity of cables used for wiring of a computer to a multiplicity of mating cables one by one, and a plurality of mating connectors connected to a plurality of mating cables.

In this kind of insertion and withdrawal connector apparatus, a plurality of connectors integrally holding a predetermined number of cables and a plurality of mating connectors are prepared, and a plurality of connectors and a plurality of mating connectors are inserted into and withdrawn from one pair by one pair. However, there is a risk of injuring each of the cables and each of the connectors due to decrease of a working efficiency and a load incurred when working is performed.

An insertion and withdrawal connector apparatus in accordance with the first conventional art has, as shown in FIGS. 1 and 2, a connector receiving body 1 for receiving a plurality of connectors 10 in such a manner as to be insertable and withdrawable in an inserting direction I and a withdrawing direction II.

The connector receiving body 1 has a pair of frames 3 arranged in parallel to each other, a pair of frame blocks 4 mutually, integrally holding each of both end surfaces in a longitudinal direction of a pair of frames 3, and a plurality of partition members 5 which partition the longitudinal distance between a pair of frame blocks 4 so as to separate it into predetermined intervals and which are attached to a pair of frames 3.

A pair of frame blocks 4 and a pair of frames 3 are integrally held by screws 6. In the connector receiving body 1, a plurality of space portions partitioned by each of the frames 3, each of the frame blocks 4 and each of the partition members 5 become a plurality of receiving chambers 7 for receiving a plurality of connectors 10 and a plurality of mating connectors 20. In each of a plurality of receiving chambers 7, a plurality of connectors 10 and a plurality of mating connectors 20 are received in an inserting and withdrawing direction one to one.

Further, in the connector receiving body 1, a plurality of space portions partitioned by a pair of frames 3 and each of the partition members 5 become a plurality of receiving chambers 7 for receiving a plurality of connectors 10 and a plurality of mating connectors 20.

A plurality of cables 15 are connected to each of the connectors 10, and a pair of projections 18 for locking in one-touch a pair of frames 3 of the connector receiving body 1 and for driving a slider are provided on both of upper and lower surfaces of each of the connectors 10. A pair of projections 19 for locking in one-touch a pair of frames 3 of the connector receiving body 1 and for driving a slider are provided on both of upper and lower surfaces of each of the mating connectors 20.

Incidentally, a plurality of conductive contacts (not shown) are incorporated in each of the connectors 10, and these contacts are connected to a plurality of cables 15 one to one. Further, a plurality of conductive mating contacts 21 such as pin contacts are attached to each of the mating connectors 20 in such a manner as to be in contact with the above contacts, and these mating contacts 21 are connected to contacts of apparatus side connectors held by a device holding the connector apparatus.

Further, in each of the connectors 10, an engagement portion 10b is provided at a front end portion of the inserting direction I side. A plurality of insertion holes capable of inserting each of the mating contacts 21 are formed in each of the engagement portion 10b.

Each of a pair of frames 3 has a frame plate portion 3a having an elongate plate shape, and a pair of guide portions 3b formed in a longitudinal direction at both sides of the inserting and withdrawing directions I and II of each of the connectors 10, that is, at both edge portions which are a pair of sides parallel to a longitudinal direction of each of the frame plate portions 3a. Each of the guide portions 3b is a portion which extends to an upper portion of each of the frame plate portions 3a from each of the both edge portions in the longitudinal direction of each of the frame plate portions 3a and which is curved in parallel to the frame plate portion 3a.

Further, in each of the frame plate portions 3a, there are formed a plurality of projection moving windows 25 long extending in the inserting and withdrawing directions I and II from an edge end of a side inserting each of the connectors 10. A locking spring piece 26 which has a substantially L shape and whose one end is connected to the frame plate portion 3a so as to extend to the inserting and withdrawing directions I and II is formed in each of the projection moving windows 25. The locking spring piece 26 has the same thickness as a thickness of the frame plate portion 3a, and has an elastic force in a direction perpendicular to the inserting and withdrawing directions I and II.

Since the projection 18 of the connector 10 moves in the inserting direction I along an inner side of the projection moving window 25 and a hook portion 26a formed in a front end of the locking spring piece 26 is pushes by the projection 18 when the connector 10 is inserted into the receiving chamber 7, the locking spring piece 26 pushes the connector 10 into the inner part of the receiving chamber 7 while being flexed. When the connector 10 is pushed into the inner part of the receiving chamber 7, the locking spring piece 26 returns to an original state. Under this state, the hook portion 26a prevents the projection 18 from moving in the withdrawing direction II. Since the operation is performed in the above manner, the connector 10 can be locked in one-touch within the receiving chamber 7.

Further, a plurality of projection windows 55 long extending to the inserting and withdrawing directions I and II from the edge end opposite to the edge end in the side inserting each of the connectors 10 are formed in the frame plate portion 3a. The projection 19 of each of the mating connectors 20 is fitted to the inner side of each of the projection windows 25. Under this state, since each of the projections 19 is fitted to a pair of positions of each of the projection windows 55, each of the mating connectors 20 is held within the receiving chamber 7.

Incidentally, each of the projection moving windows 25 and each of the projection window 55 are disposed in a positional relation in which they are aligned in a widthwise direction (corresponding to the inserting and withdrawing directions I and II) and a longitudinal direction of the frame plate portion 3a, and are positioned such that a pair of them are positioned in each of the receiving chambers 7.

Under a state that each of the connectors 10 and each of the mating connectors 20 are received in the connector receiving chamber 1, each of the projections 18 and each of the projections 19 project above the frame plate portion 3a. And, each of the projections 18 is adapted so as to be capable of moving in the inserting and withdrawing directions within a range of the projection moving window 25. Incidentally, since the hook portion 26a of the locking spring piece 26 exists in the withdrawing direction II, each of the connectors 10 is not separated from the connector receiving body 1.

Further, a plurality of slits 30 are formed in the frame plate portion 3a in order to fit and hold each of the partition members 5.

On the frame plate portion 3a, each of the projections 18 is interlocked with a slider 41, and it is so adapted that each of the connectors 10 can be engaged with and separated from each of the mating connectors 20 by moving the slider 41 shown in FIG. 3 in the longitudinal direction.

The slider 41 has a slider block 42 and a pair of slider plate portions 43 each of which is formed in an elongate plate shape and whose one end surface is held to each of a pair of side surfaces of the slider block 42 by screws 44 so as to be arranged in parallel with and facing each other. A first slider groove portion 50a and a second slider groove portion 50b are symmetrically formed in each of the facing surfaces of a pair of slider plate portions 43.

The first slider groove portion 50a has a linear groove portion 45a extending in a front end direction of a pair of slider plate portions 43 from the slider block 42 side, and a projection inserting groove portion 47a extending following to the linear groove portion 45a.

The second slider groove portion 50b has a linear groove portion 45b extending in a front end direction of a pair of slider plate portions 43 from the slider block 42 side in parallel to each other, an inclined groove portion 46 which follows the linear groove portion 45b and is obliquely expanded to a distance wider than a distance between the linear groove portions 45a and 45b at a portion close to the front end of a pair of slider plate portion 43, and a projection inserting groove portion 47b successively extending to the front end side of the inclined groove portion 46.

That is, the projection 18 of each of the connectors 10 and the projection 19 of each of the opposing connectors 20 are respectively fitted to the projection inserting groove portions 47a and 47b having a width larger than a diameter thereof, and by driving the slider 41 in a longitudinal direction perpendicular to the inserting and withdrawing directions, each of the connectors 10 and each of the mating connectors 20 can be engaged with and separated from each other. An engagement between each of the connectors 10 and each of the mating connectors 20 can be performed by the fact that the projection 18 slides on an engagement inclined surface 46a of the inclined groove portion 46, and a separation therebetween can be performed by the fact that the projection 18 slides on a separation inclined surface 46b of the inclined groove portion 46. The engagement is successively performed by the fact that the projection 18 slides on the engagement inclined surface 46a of a pair of slider plate portions 43, and the projections 18 and 19 are received in the linear groove portions 45a and 45b of a pair of slider plate potion 43 so as to be locked immediately after the engagement.

After each of the connectors 10 has engaged with each of the mating connectors 20 and thus the drive has completed, the slider 41 locks each of the connectors 10 and each of the mating connectors 20 under a state that they are being engaged with each other. When separating each of the connectors 10 from each of the mating connectors 20, a handle 48 mounted in the slider block 42 is held and the slider 41 is driven while being pulled in a reverse direction.

Incidentally, another conventional insertion and withdrawal connector apparatus is disclosed in Japanese Patent Unexamined Publication (JP-A) No. 273753 of 1996.

However, in the connector apparatus shown in the conventional arts, the locking spring piece 26 extending in the inserting and withdrawing directions I and II is positioned in each of the projection moving windows 25, the projection 18 of each of the connectors 10 moves in the inserting direction I along the inner side of each of the projection moving windows 25 when each of the connectors 10 is inserted into each of the receiving chambers 7, so that each of the projections 18 is prevented from moving in the withdrawing direction II by each of the hook portions 26a. Accordingly, when the interval for receiving each of the connectors 10 in each of the receiving chambers 7 becomes narrow, a space for forming each of the locking spring piece 26 in the frame plate portion 3a can not be secured.

Further, when each of the locking spring piece 26 is formed in each of the projection moving windows 25, it is necessary to form each of the large projection moving windows 25 in the frame 3 itself, so that there is a problem that a strength and a rigidity of the frame 3 are reduced. Accordingly, it is hard in structure to make an interval between the connectors 10 narrow.

Still further, each of the connectors 10 is prevented from coming off in the inserting direction I and excessively moving by each of the projection moving windows 25 of the frame 3 and each of the projections 18, but, in case of adopting some kinds of connectors 10 respectively having projections 18 disposed at different positions to the same connector receiving body 1, since the position of each of the projections 18 is near each of the cables 15 side (the end portion of each of the connectors 10), there is a problem that each of the connectors 10 excessively moves in the inserting direction I after interlocked by each of the locking spring pieces 26.

Next, a second conventional art will be described below. In the insertion and withdrawal connector apparatus, a structure of preventing each of the connectors from being erroneously inserted (an inverse insertion between an upper side and a lower side) by changing each of groove widths of a pair of-frames and a diameter of each of the projections disposed in both upper and lower sides of each of the connectors has been conventionally adopted.

However, in this insertion and separation connector apparatus, it is necessary to change the groove width of each of the sliders in correspondence to the diameter of each of the projections. Accordingly, it is necessary to prepare a plurality of sliders respectively having different groove widths in correspondence to the diameter of each of the projections.

Next, a structure for remote-controlling an engagement and separation of the insertion and withdrawal connector apparatus in accordance with a third conventional art will be described below. A relay frame is fixed to a front surface of a wired casing, and the relay frame holds a multiplicity of aligned cable connectors. A pair of sliders for engaging and separating a multiplicity of cable connectors with and from a multiplicity of aligned front connectors are mounted to the relay frame. A groove for successively moving a multiplicity of cable connectors is provided in each of the sliders. A cage is fixed to a front surface of the wired casing, and a pair of rails having ten plus several steps are fixed to the cage. A printed wiring board is mounted on each of a pair of rails, and a multiplicity of aligned front connectors are mounted on the printed wiring board. In case of directly sliding a pair of sliders by a manual force, the cage is disassembled at every time the insertion and withdrawal connector apparatus is engaged and separated.

In the structure for remote-controlling engagement and separation of the insertion and withdrawal connector apparatus in accordance with the third conventional art, since the cage is disassembled at every time the insertion and withdrawal connector apparatus is engaged and separated when directly sliding a pair of sliders by a manual force, an operation is complex.

Further, since an operation force required for sliding a pair of sliders is determined by an inserting and withdrawing force of the insertion and withdrawal connector and an angle of a groove in each of the sliders, it is necessary to modify a metal mold of each of the sliders and to change a design of each of the connectors for changing an operation force required for sliding a pair of sliders once each of the connectors and the engagement and separation structure are manufactured, so that a cost becomes expensive.

Still further, a connecting frame block structure which is a fourth conventional art will be described below. When connecting mutually connection frame blocks such as an insertion and withdrawal connector apparatus for a cable having a large number of cores and a high density, a first connection frame block and a second connection frame block mentioned below are used for accurately positioning and firmly connecting them. That is, two guide pins and one through hole for a fixing screw are provided in the first connection frame block, and two guide holes and one fixing screw hole are provided in the second connection frame block in correspondence thereto.

And, after positioning by inserting two guide pins in the first connection frame block to two guide holes in the second connection frame block, one fixing screw is inserted into the through hole for the fixing screw in the first connection frame block and fastened to a fixing screw hole in the second connection frame block.

In the connection frame block structure in accordance with the fourth conventional art, since a thickness of a material between two guide holes becomes thin when an interval between two guide holes in the second connection frame block is shortened, a strength of the second connection frame block is lowered.

Accordingly, in the connection frame block structure in accordance with the fourth conventional art, since the interval between two guide holes in the second connection frame block can not be shortened, there is a limit for making it small.

SUMMARY OF THE INVENTION

Accordingly, an object of the invention is to provide an insertion and withdrawal connector apparatus for preventing each of connectors before engagement from moving in a withdrawing direction.

Another object of the invention is to provide an insertion and withdrawal connector apparatus having a function of preventing each of connectors from being erroneously inserted without changing a width of each of grooves of sliders.

Still another object of the invention is to provide a structure for remote-controlling engagement and separation of an insertion and withdrawal connector apparatus, in which it is not necessary to disassemble a cage when engaging and separating and, moreover, an operation force required for sliding a pair of sliders can be easily changed.

Further, yet another object of the invention is to provide a connection frame block structure for an insertion and withdrawal connector apparatus, which is compact and rigid.

In accordance with an aspect of this invention, there is provided an insertion and withdrawal connector apparatus comprising a connector receiving body which has a pair of parallel frames, a pair of frame blocks positioned at both end portions, and a plurality of partition members, and which is constituted in such a manner that one connector and one mating connector are received in each of a plurality of receiving chambers partitioned by the frames, the frame blocks, and the partition members, characterized in that each of the partition members has a lance with a spring characteristic, each of the connectors has an interlocking groove portion, and each of the connectors is prevented from moving in a withdrawal direction by the fact that each of the lance interlocks with the interlocking groove portion in the midway that each of the connectors is inserted into each of the receiving chambers.

In accordance with another aspect of this invention, there is provided an insertion and withdrawal connector apparatus comprising: a plurality of connectors each having substantially cylindrical first and second projections; a first frame holding each of the connectors in such a manner as to be movable in a first direction, extending along the first direction and having each of first holding grooves movably receiving each of the first projections; a second frame holding each of the connectors in such a manner as to be movable in the first direction, extending along the first direction and having each of second holding grooves movably receiving each of the second projections; a first slider provided in the first frame in such a manner as to be movable in a second direction, and having a first cam groove receiving each of the first projections and being brought into contact with each of the first projections so as to move each of the first projections in the first direction; and a second slider provided in the second frame in such a manner as to be movable in the second direction, and having a second cam groove receiving each of the second projections and being brought into contact with each of the second projections so as to move each of the second projections in the first direction; characterized in that a diameter of each of the first projections and a diameter of each of the second projections are equal, each of the first projections has a recess portion, at least a part of each of the recess portion is inserted into each of the first holding grooves and a width of each of the recess portions in a widthwise direction of each of the first holding grooves is set to be smaller than the diameter of each of the second projections, a width of each of the first holding grooves corresponds to the width of each of the recess portions in the widthwise direction of each of the first holding grooves, and a width of the first cam groove and a width of the second cam groove are equal.

In accordance with still another aspect of this invention, there is provided a structure for remote-controlling engagement and separation of an insertion and withdrawal connector apparatus comprising: a drive shaft; a first bevel gear fixed to the drive shaft; a second bevel gear meshed with the first bevel gear; a screw shaft to which the second bevel gear is fixed; a nut fitted to the screw shaft; a pair of slide plates fixed to the nut; a pair of guide plates guiding the pair of slide plates; and a pair of sliders fixed to the pair of slide plates and engaging and separating a plurality of connectors with and from a plurality of mating connectors.

In accordance with yet another aspect of this invention, there is provided a connection frame block structure comprising: a first connection frame block in which two guide pipes and two fixing screw through holes coaxial with the two guide pipes are provided; a second connecting frame block in which two guide holes and two fixing screw holes coaxial with the two guide holes are provided; and two fixing screws; characterized in that the two fixing screws are respectively inserted into the two guide pipes, the two fixing screw through holes and the two guide holes so as to be fastened to the two fixing screw holes.

BRIEF DESCRIPTION OF THE DRAWINGS

FIG. 19A is a front view of the insertion and withdrawal connector apparatus in accordance with the second embodiment of the invention;

FIG. 19B is a plan view of the insertion and withdrawal connector apparatus in accordance with the second embodiment of the invention;

FIG. 21A is a bottom view of an insertion and withdrawal connector apparatus in accordance with a third embodiment of the invention;

FIG. 21B is a front view of the insertion and withdrawal connector apparatus in accordance with the third embodiment of the invention;

FIG. 26 is a sectional view which shows a relation between the slider slid by the structure for remote-controlling engagement and separation of the insertion and withdrawal connector apparatus in accordance with the sixth embodiment of the invention, and the cable connectors and the front connectors;

FIG. 29 is a plan view of the drive mechanism for the slider in the structure for remote-controlling engagement and separation of the insertion and withdrawal connector apparatus in accordance with the sixth embodiment of the invention, and a handle;

FIG. 30A is a front view of two insertion and withdrawal connector apparatuses connected by a connection frame block structure in accordance with a seventh embodiment of the invention;

FIG. 30B is a plan view of two insertion and withdrawal connector apparatuses connected by the connection frame block structure in accordance with the seventh embodiment of the invention;

DESCRIPTION OF THE PREFERRED EMBODIMENTS

Seven embodiments of the invention will be successively described below.

Figure 1:
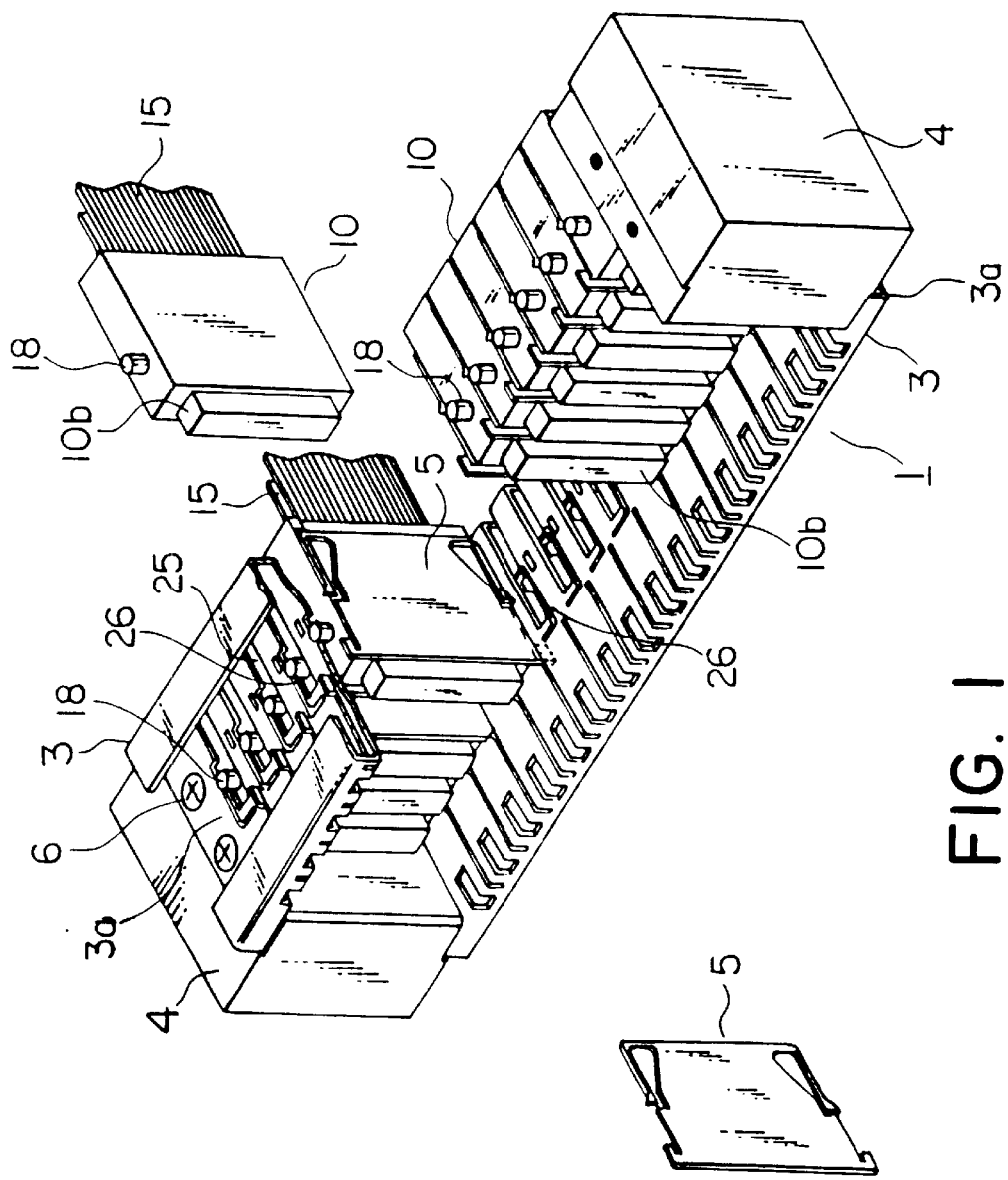
FIG. 1 is a perspective view of a conventional insertion and withdrawal connector apparatus.
Figure 2:
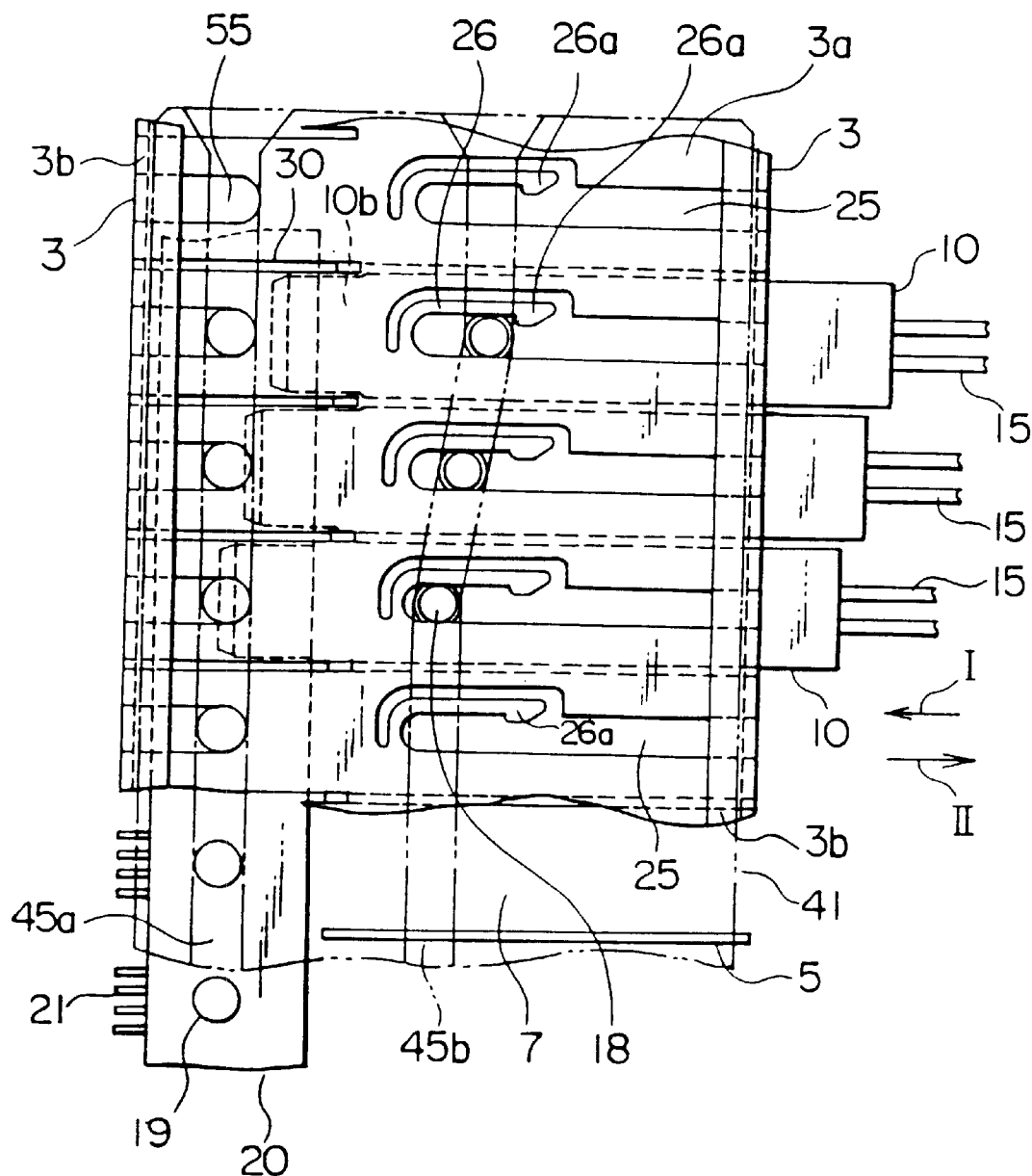
FIG. 2 is a plan view which shows an engaging process of the conventional insertion and withdrawal connector apparatus.
Figure 3:
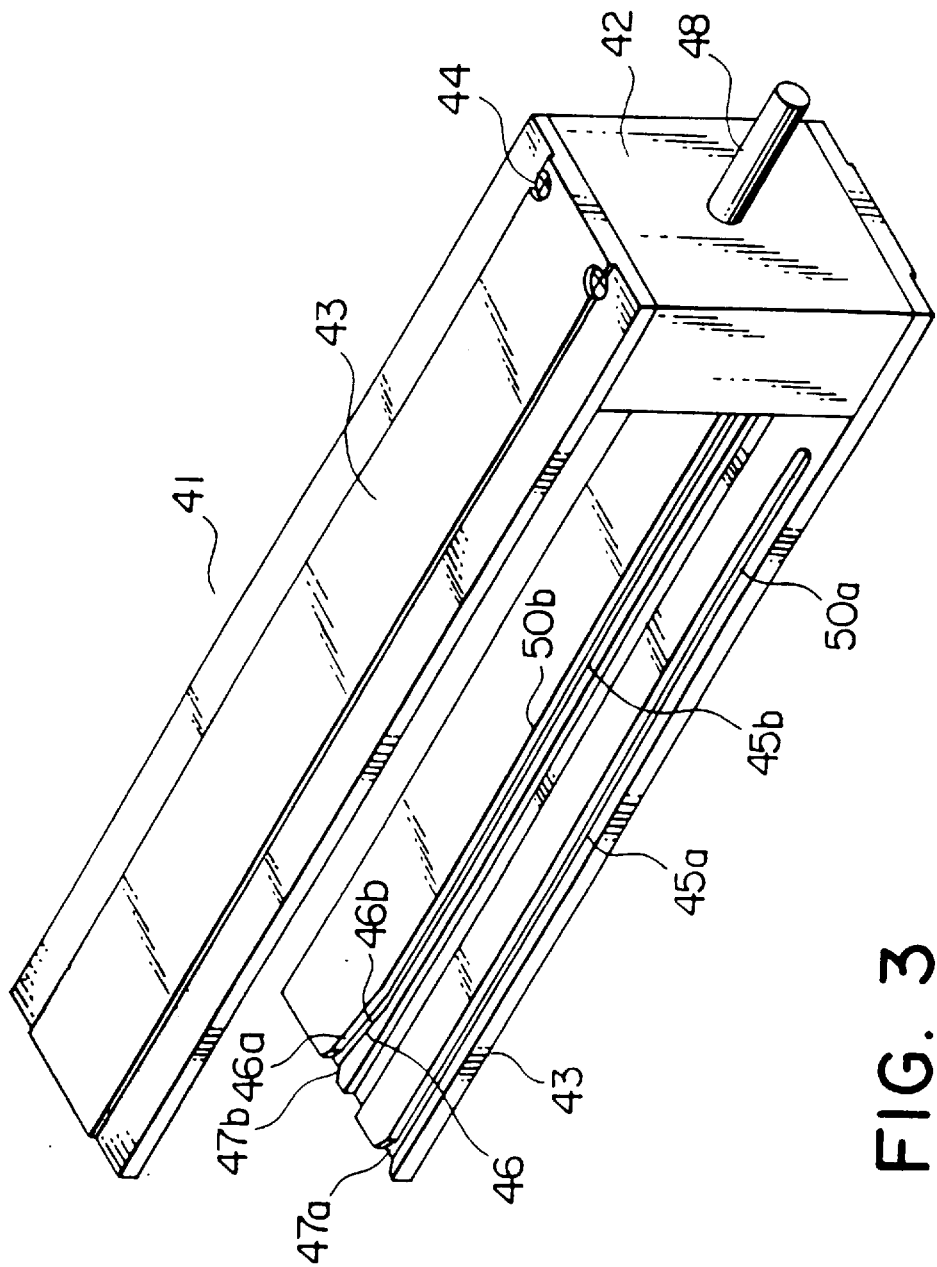
FIG. 3 is a perspective view of a slider in the conventional insertion and withdrawal connector apparatus.
Figure 4:
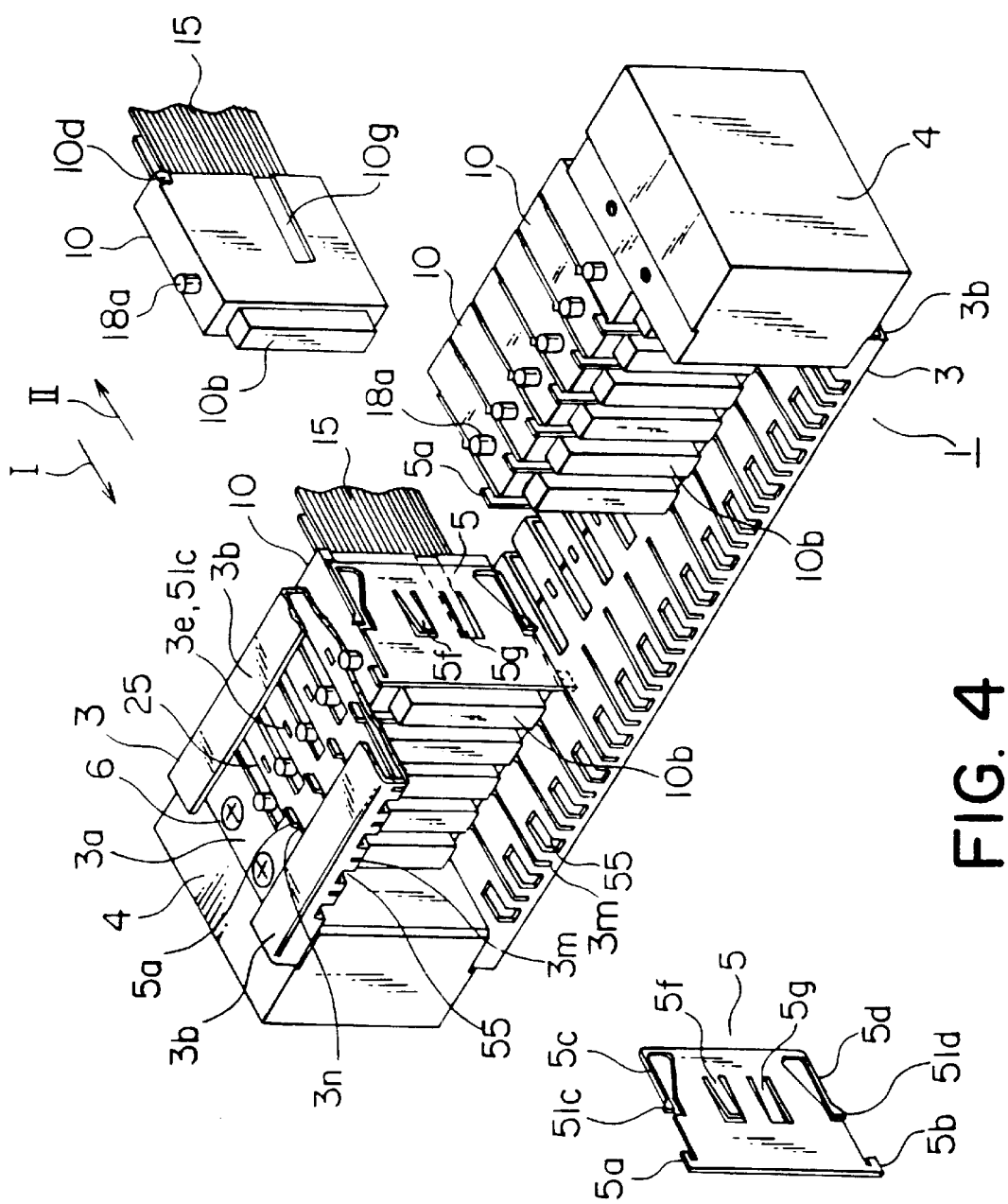
FIG. 4 is a perspective view of an insertion and withdrawal connector apparatus in accordance with a first embodiment of the invention.
Figure 5:
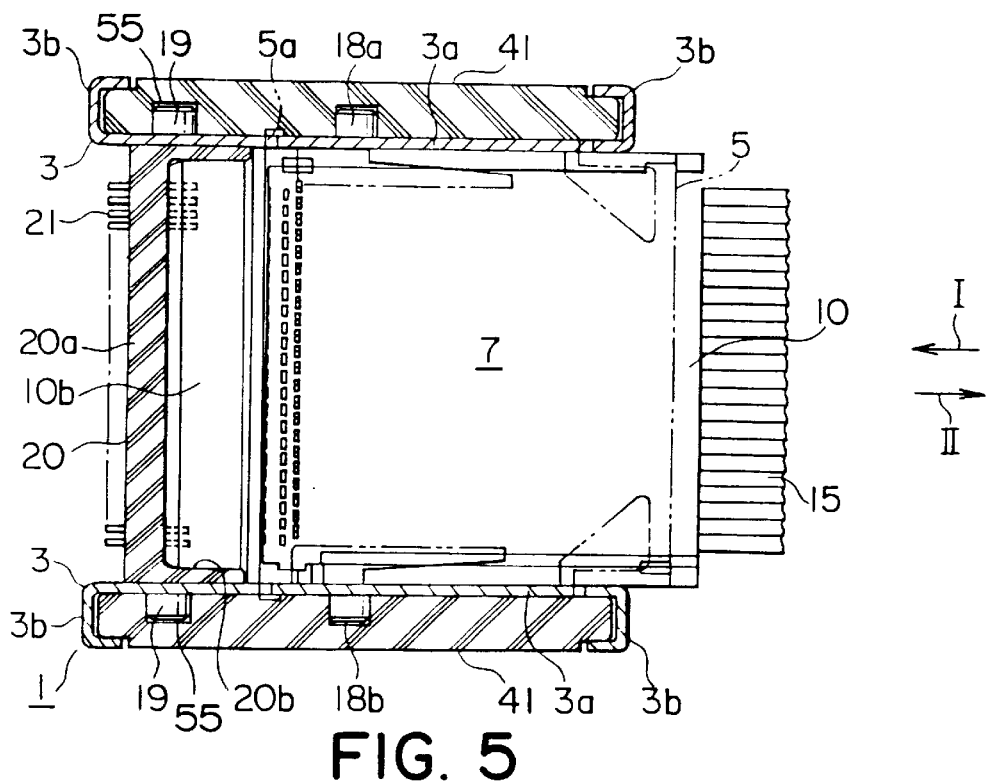
FIG. 5 is a vertical sectional view of the insertion and withdrawal connector apparatus in accordance with the first embodiment of the invention.
Figure 6:
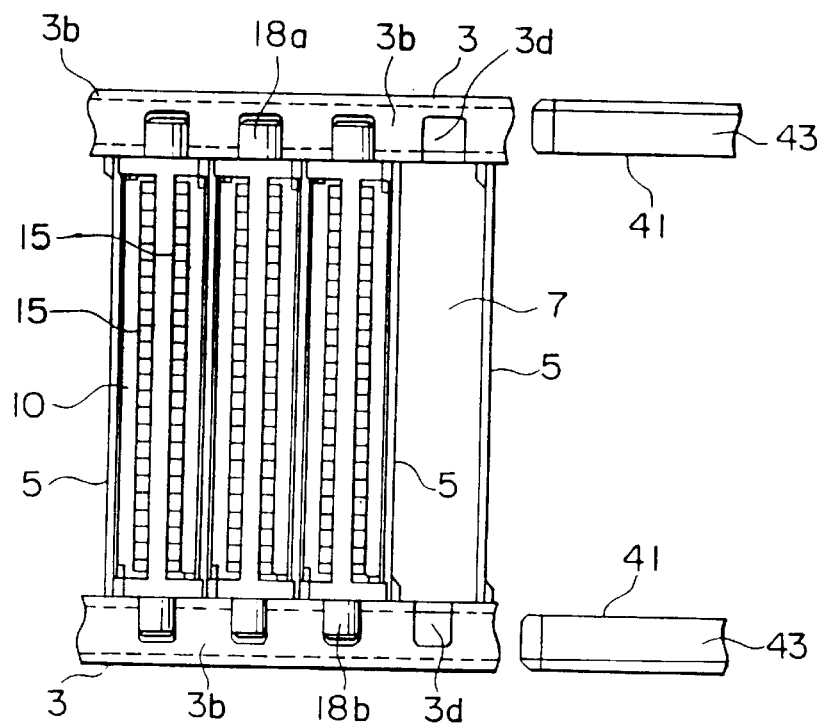
FIG. 6 is a rightward side view of the insertion and withdrawal connector apparatus shown in FIG. 5.

FIGS. 4 to 6 show an insertion and withdrawal connector apparatus in accordance with a first embodiment of the invention. Incidentally, the same reference numerals are attached to the same elements as those in the insertion and withdrawal connector apparatus shown in the first conventional art.

With reference to FIGS. 4 to 6, the insertion and withdrawal connector apparatus has a connector receiving body 1 for receiving a plurality of connectors 10 in such a manner as to be capable of inserting and withdrawing in an insertion directing I and a withdrawing direction II shown by arrows in FIGS. 4 and 5. A plurality of mating connectors 20 respectively engaged with a plurality of connectors 10 one to one are provided in the connector receiving body 1.

The connector receiving body 1 has a pair of frames 3 arranged in parallel to each other, a pair of frame blocks 4 mutually, integrally holding each of both end surfaces in a longitudinal direction of a pair of frames 3, and a plurality of partition members 5 which partition in such a manner as to separate a space in the longitudinal direction between a pair of frame blocks 4 into a predetermined interval and which are arranged so as to be mounted to a pair of frames 3 in parallel to each other. A pair of frame blocks 4 and a pair of frames 3 are integrally held by screws 6. A plurality of partition members 5 are made of a metal plate or a resin plate.

Further, the connector receiving body 1 serves as a plurality of receiving chambers 7 adapted such that a plurality of space portions defined by a pair of frames 3, a pair of frame blocks 4 and a plurality of partition members 5 receive a plurality of connectors 10. One connector 10 and one mating connector 20 are received one to one in each of a plurality of receiving chambers 7.

Two band-like cables 15 such as a flat ribbon cable are connected to each of the connectors 10, and a pair of projections 18a and 18b for one-touch locking to a pair of frames 3 of the connector receiving body 1 and for driving a slider are projected on each of a pair of side surfaces mutually facing each other. A pair of projections 18a and 18b are formed in a cylindrical shape.

Further, a pair of projections 19 for one-touch locking to each of the frames 3 of the connector receiving body 1 and for driving a slider are projected on both upper and lower surfaces in each of the mating connectors 20.

Figure 7:
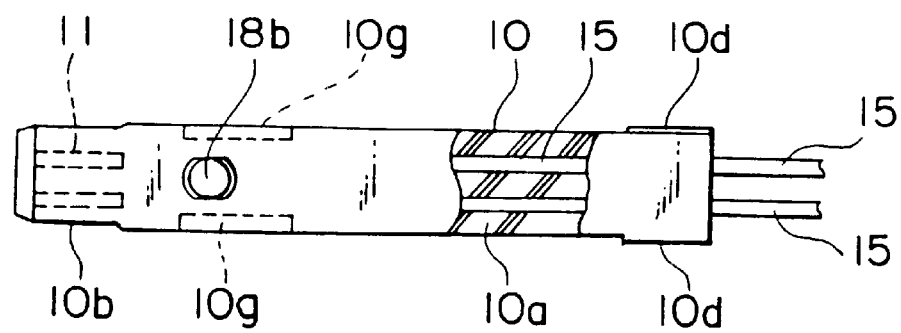
FIG. 7 is a bottom view of a connector in the insertion and withdrawal connector apparatus in accordance with the first embodiment of the invention, in which part of the connector is shown in broken state.
Figure 8:
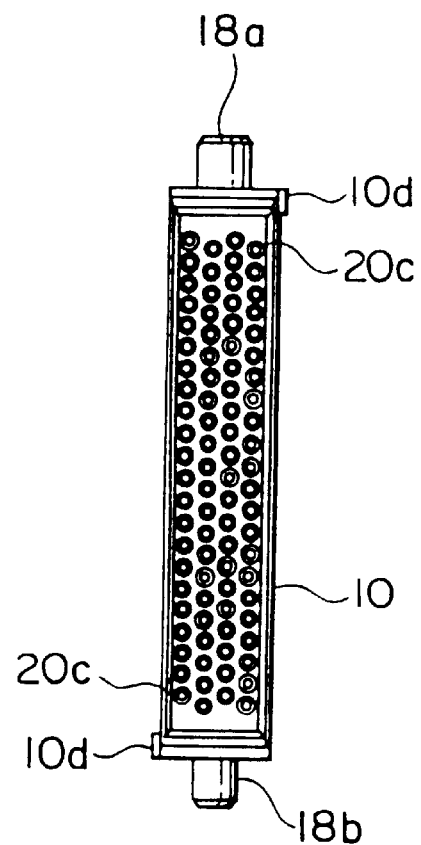
FIG. 8 is a front view of the connector in the insertion and withdrawal connector apparatus in accordance with the first embodiment of the invention.

Incidentally, as shown in FIG. 7, each of the connectors 10 has an insulator 10a and a plurality of conductive contacts 11 incorporated into the insulator 10a, and these contacts 11 are connected to a core wire of a cable 15 one to one. The insulator 10a has an engagement portion 10b at a front end portion in the inserting direction I of the connector 10. The contacts 11 are arranged in the engagement portion 10b so as to be aligned. As shown in FIG. 8, a plurality of contact holes 20c are formed on an end surface of the engagement portion 10b.

Convex portions 10d are formed on an upper end portion of one side surface and a lower end portion of the other side surface in the insulator 10a.

Further, each of the mating connectors 20 is called as a pin header, and has an insulator 20a and a conductive contact 21 such as a pin contact incorporated into the insulator 20a. An engagement portion 20b formed in a large groove shape and receiving the engagement portion 10b is formed in the insulator 20a. A portion of the contact 21 extending to an outer side of the insulator 20a is connected to a contact (not shown) of an apparatus side connector. And, a portion of the contact 21 positioned at the engagement portion 20b is inserted into a contact hole 20c formed in the engagement portion 10b so as to be brought into contact with the contact 11.

Returning to FIG. 4, each of a pair of frames 3 has a frame plate portion 3a of an elongate plate shape, and a pair of guide portions 3b disposed which exist at both edge portions corresponding to a pair of sides parallel to a longitudinal direction of the frame plate portion 3a and which are formed in a longitudinal direction. The guide portion 3b is a portion which extends upwardly to the frame plate portion 3a from each of both edge portions in the longitudinal direction of the frame plate portion 3a and which is further bent in parallel to the frame plate portion 3a.

Further, a plurality of projection moving windows 25 long extending in the inserting and withdrawing directions I and II from the edge in the side of inserting the connector 10 are formed in the frame plate portion 3a. Incidentally, as shown in FIG. 6, a notch portion 3d is formed at a portion extending to the upper portion of the frame plate portion 3a in the guide portion 3b following the projection moving window 25.

Still further, a plurality of projection windows 55 long extending in the inserting and withdrawing directions I and II from an edge opposite to the edge in the side of inserting the connector 10 are formed in the frame plate portion 3a. As shown in FIG. 5, in a plurality of projection windows 55, a projection 19 of each of the mating connectors 20 is fitted into an inner portion inside each of the projection window 55. Under this state, since each of the projections 19 is fitted to a pair of positions in each of the projection windows 55, each of the mating connectors 20 is held within each of the receiving chambers 7.

Incidentally, each of the projection moving windows 25 and each of the mating projection windows 55 are in a positional relation in which they are aligned in a width direction (corresponding to the inserting and withdrawing directions I and II) of the frame plate portion 3a and a longitudinal direction thereof, and a pair of them are positioned in each of the receiving chambers 7.

Under a state that each of the connectors 10 and each of the mating connectors 20 are received in the connector receiving chamber 1, each of the projections 18a and 18b and each of the projections 19 are projected on the frame plate portion 3a. And, each of the projections 18a and 18b is adapted so as to be movable in the inserting and withdrawing directions I and II within the range of each of the projection moving windows 25.

Further, a slit 3m for fitting and holding a pair of interlocking portions 5a and 5b formed in upper and lower ends of each of the partition members 5 is formed in each of the frame plate portions 3a. When each of the connectors 10 is inserted into each of the receiving chamber 7, the projections 18a and 18b of each of the connectors 10 move in the inserting direction I along the inner side of each of the projection moving windows 25, thereby inserting each of the connectors 10 into an inner portion of each of the receiving chambers 7.

Figure 9:
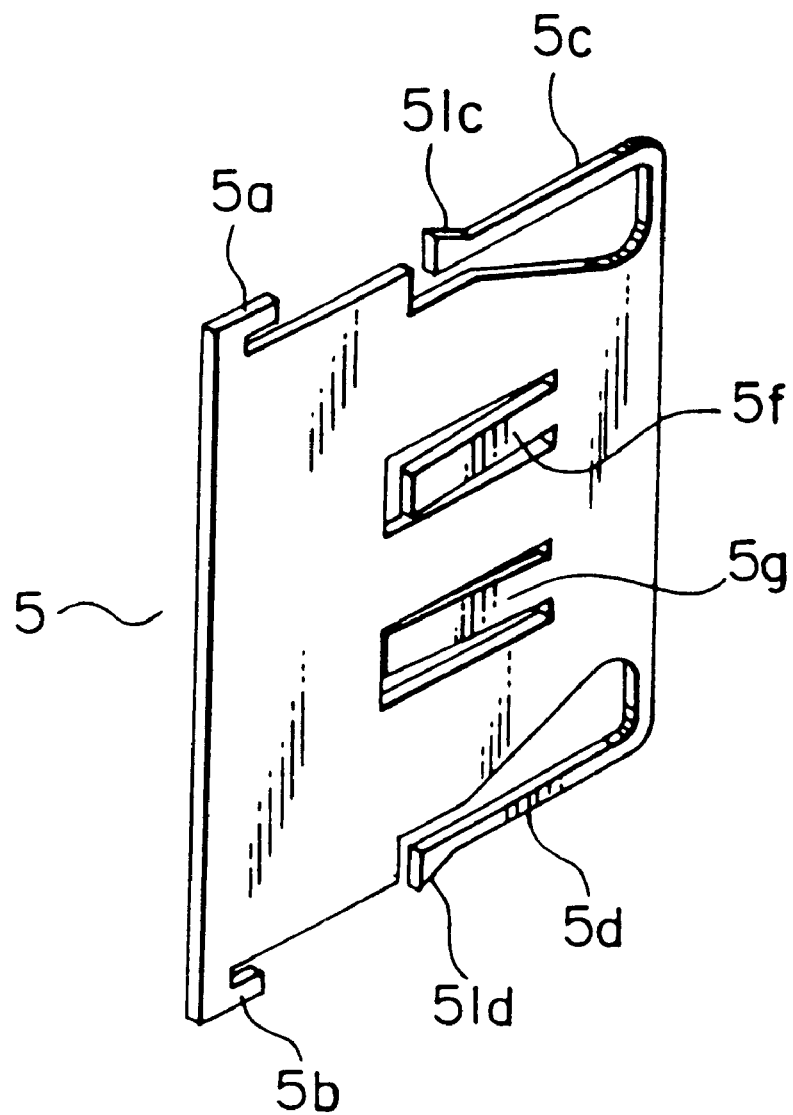
FIG. 9 is a perspective view of a partition member in the insertion and withdrawal connector apparatus in accordance with the first embodiment of the invention.

As shown also in FIG. 9, the partition member 5 has a pair of interlocking portions 5a and 5b, a pair of spring portions 5c and 5d extending from a withdrawing direction II side to an inserting direction I side so as to face the interlocking portions 5a and 5b, and a pair of lances 5f and 5g projecting to each of the adjacent receiving chambers 7 one to one so as to extend in a gradually inclining manner and having a spring characteristic.

A front end portion of a pair of interlocking portions 5a and 5b slightly projects above the frame plate portion 3a. Interlocking projections 51c and 51d are formed at their free ends of a pair of spring portions 5c and 5d, respectively. These interlocking projections 51c and 51d are fitted into a plurality of projection receiving holes 3e formed in the frame plate portion 3a one to one. A plurality of projection receiving holes 3e are formed between a plurality of projection moving windows 25 one by one.

A pair of lances 5f and 5g are connected to the partition member 5 at their one ends, and extend in the inserting and withdrawing directions I and II. One 5f of the lances is positioned in one (the upper side in FIG. 4) of the frame plate portions 3a side, and the other 5g of the lances is positioned in the other (the lower side in FIG. 4) of the frame plate portions 3a side.

In case that the partition member 5 is a metal plate, a pair of lances 5f and 5g are made by bending after punched by a press.

In the connector 10 mentioned above, as shown in FIG. 7, a pair of interlocking groove portions 10g are formed in side surfaces of the insulator 10a, that is, in side surfaces respectively facing a pair of lances 5f and 5g. A pair of lances 5f and 5g are adapted so as to be interlocked with a pair of interlocking groove portions 10g when the connector 10 is received in the receiving chamber 7 to a predetermined position (a midway position of engagement).

That is, until the connector 10 enters to a predetermined position in the receiving chamber 7, the connector 10 is inserted while pressing a pair of lances 5f and 5g of two partition members 5 facing each other in both side surfaces of the insulator 10a and slightly flexing them. And, the front ends of a pair of lances 5f and 5g of two partition members 5 are brought into contact with each of the groove walls of a pair of interlocking groove portions 10g and interlocked. In this case, a pair of lances 5f and 5g are returned to an original state. Under this state, the connector 10 is prevented from moving in the withdrawing direction II. Due to the operation mentioned above, the connector 10 can be locked in one-touch within the receiving chamber 7.

Under this state, the connector 10 and the mating connector 20 are not engaged with each other yet. In order to engage the connector 10 with the mating connector 20, the operation is performed by using a slider 41 shown in FIG. 10.

Each of the projections 18a and 18b and the projection 19 positioned on the frame plate portion 3a is engaged with the slider 41, and is adapted in such a manner that the connector 10 can be engaged with and separated from the mating connector 20 by moving the slider 41 in the longitudinal direction.

The slider 41 has a slider block 42, and a pair of slider plate portions 43 which are formed in an elongate plate shape and whose one ends are held to each of a pair of side surfaces of the slider block 42 by screws 44 so as to be mutually disposed in parallel and face each other.

A first sliding groove portion 50a and a second sliding groove portion 50b are formed in each of the facing surfaces of a pair of slider plate portion 43. The first sliding groove portion 50a has a straight groove portion 45a extending from a slider block 42 side to a front end direction of a pair of slider plate portion 43 and a projection inserting groove portion 47a disposed in a front end of the slider plate portion 43 following the straight groove portion 45a.

The second sliding groove portion 50b has a straight groove portion 45b extending from a slider block 42 side to a front end direction of a pair of slider plate portion 43, an inclined groove portion 46 following the straight groove portion 45b and obliquely expanded near the front end of a pair of slider plate portion 43 so as to be wider than a distance between the straight groove portions 45a and 45b, and a projection inserting groove portion 47b extending following a front end side of the inclined groove portion 46.

Incidentally, a relief groove portion 60 escaping against the convex portion of a pair of interlocking portions 5a and 5b projecting above the frame plate portions 3a and 3a is formed between the first sliding groove portion 50a and the second sliding groove portion 50b.

Next, an operation of inserting and separating each of the connectors 10 and each of the mating connectors 20 will be described below with reference to FIGS. 11 to 16.

Figure 11:
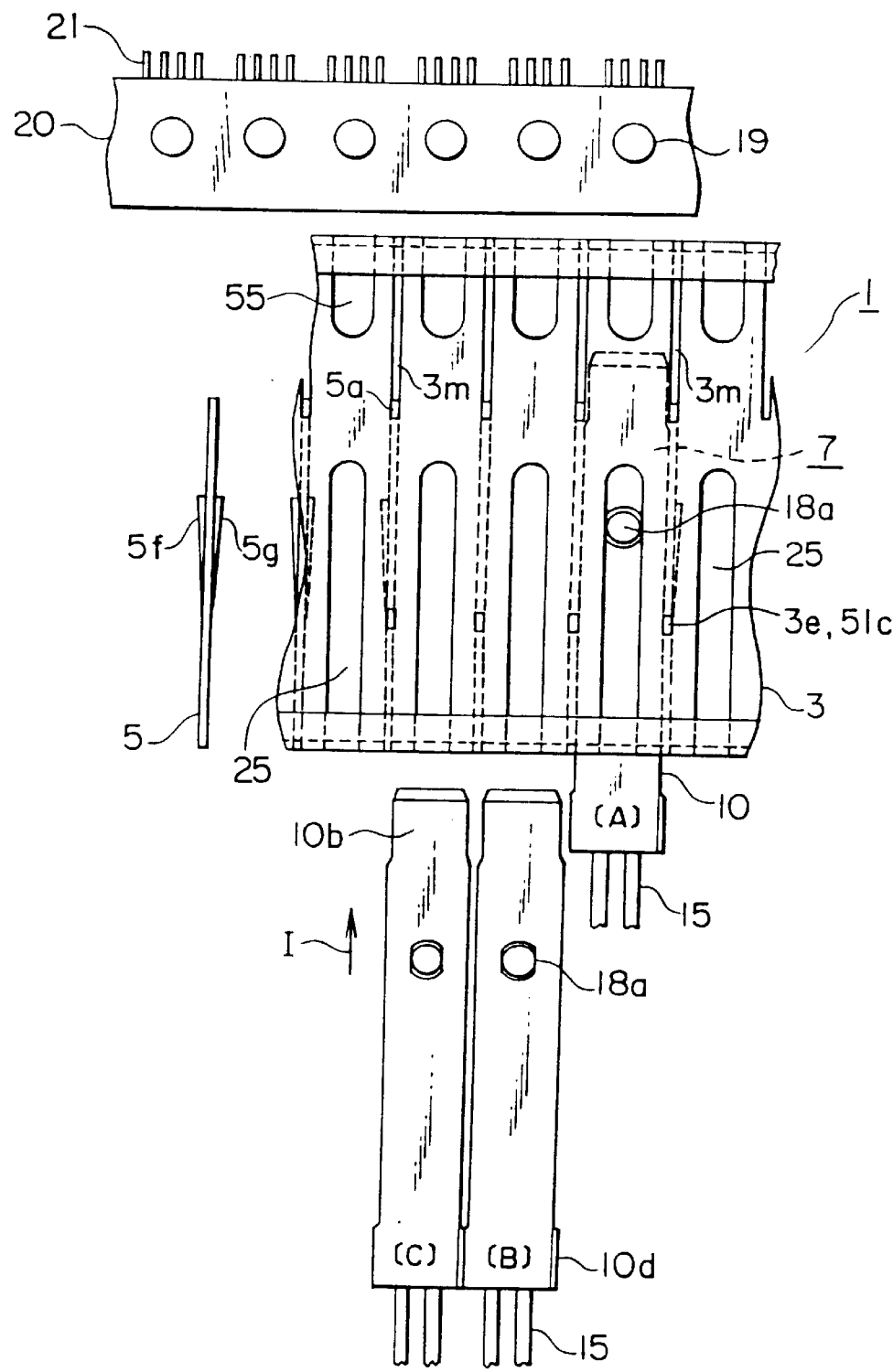
FIG. 11 is a plan view of one portion under a state that the insertion and withdrawal connector apparatus in accordance with the first embodiment of the invention is disassembled.

In FIG. 11, there is shown a state in which each of the mating connectors 20 is not held to the connector receiving body 1. And, among the connectors denoted by symbols [A], [B], and [C], the connector denoted by symbol [A] is received in the receiving chamber 7 to a predetermined position. The connector 10 denoted by symbol [A] is inserted into the receiving chamber 7 and the projection 18a is positioned in an intermediate portion of the projection moving window 25. Each of the connectors denoted by symbols [B] and [C] is received in each of the receiving chambers 7 to a predetermined position in the same manner as that of the connector denoted by symbol [A].

Figure 12:
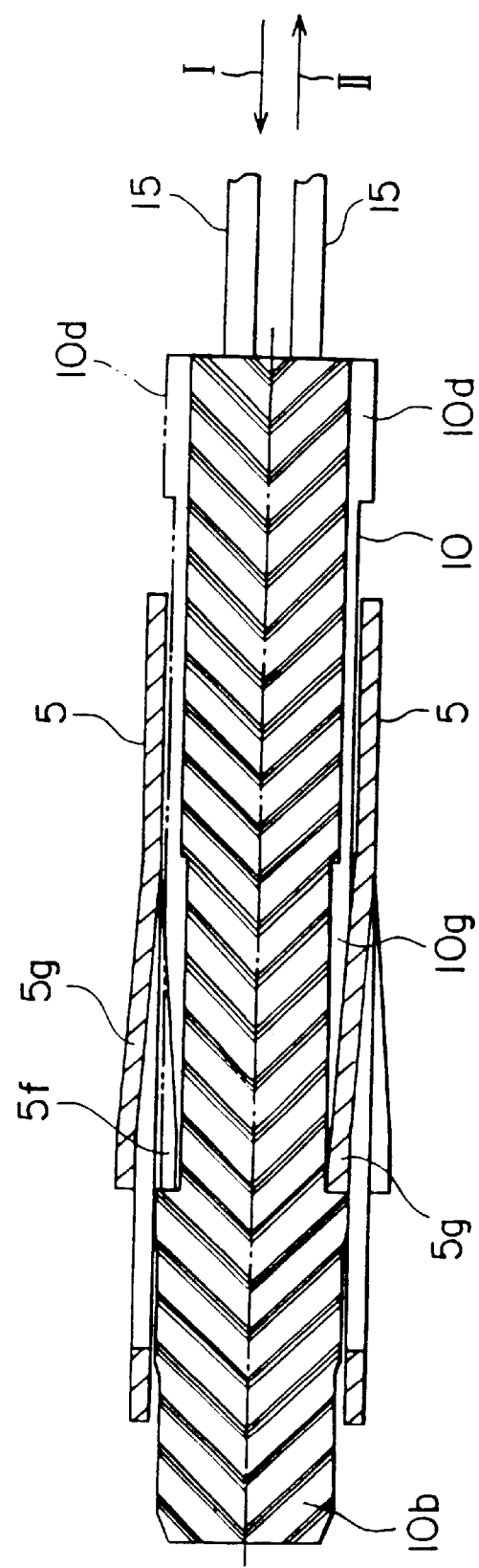
FIG. 12 is a sectional view which shows a positional relation between the connector and the partition member in a midway of inserting the insertion and withdrawal connector apparatus in accordance with the first embodiment of the invention.

When these connectors 10 are received to a predetermined position, each of the connectors 10 is inserted while pressing and flexing a pair of lances 5f and 5g on both side surfaces of each of the insulators 10a until each of the connectors 10 enters to a predetermined position of each of the receiving chambers 7. And, when a pair of lances 5f and 5g enter to a pair of interlocking groove portions 10g, as shown in FIG. 12, the front ends of a pair of lances 5f and 5g are brought into contact with each of the groove walls of a pair of interlocking groove portions 10g of an engagement portion 10b side so as to be interlocked. In this case, a pair of lances 5f and 5g are returned to an original state. Under this state, each of the connectors 10 is prevented from moving in the withdrawing direction II.

Figure 13:
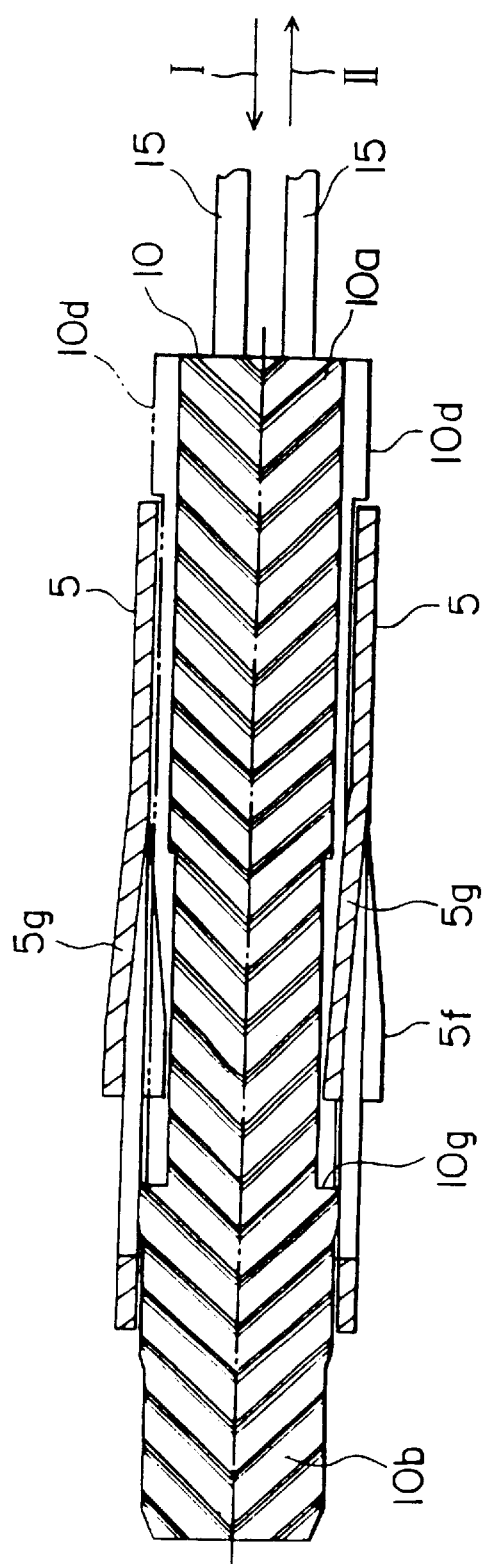
FIG. 13 is a sectional view which shows a positional relation between the connector and the partition member when engaging the insertion and withdrawal connector apparatus in accordance with the first embodiment of the invention.

Incidentally, under this state, in case that each of the mating connectors 20 is not provided in the connector receiving body 1, there is a risk that each of the connectors 10 moves in the inserting direction I. However, as shown in FIG. 13, since the convex portion 10d is formed in each of the upper end portion of one of the side surfaces of the insulator 10a and the lower end portion of the other of the side surfaces thereof, the convex portion 10d is brought into contact with the thickness end surface of each of the partition members 5, so that each of the connectors 10 is prevented from further moving in the inserting direction I.

Figure 14:
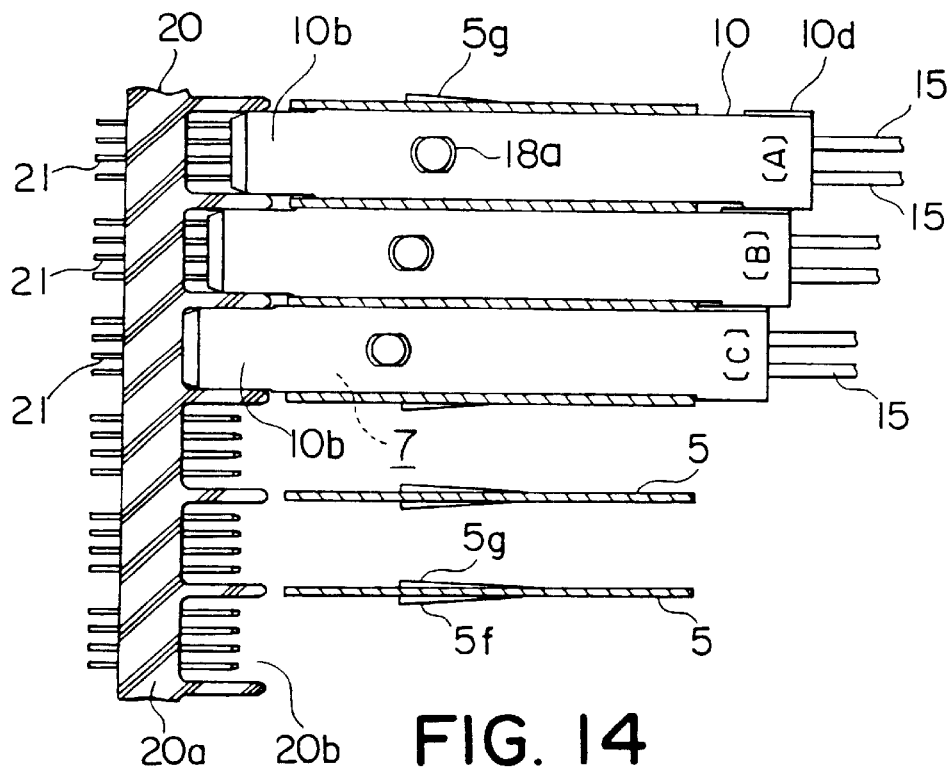
FIG. 14 is a horizontal sectional view which shows an engaging process between each of the connectors and each of the mating connectors in the insertion and withdrawal connector apparatus in accordance with the first embodiment of the invention, in which a frame and a slider are removed.
Figure 15:
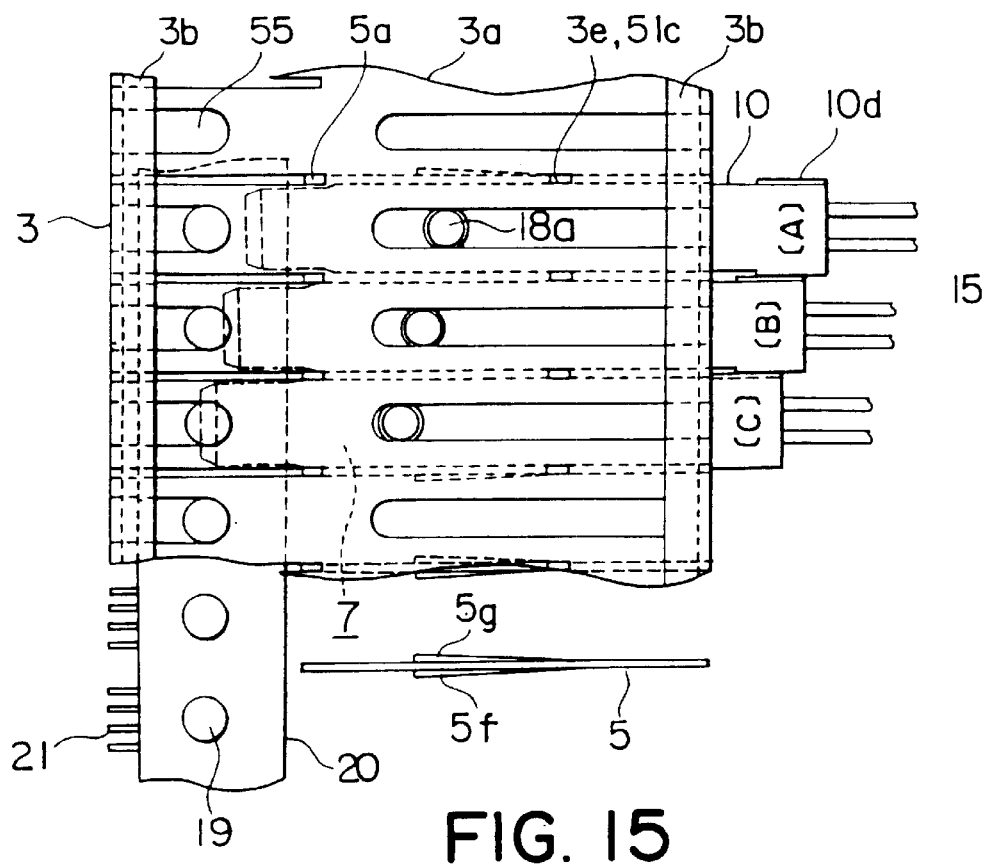
FIG. 15 is a plan view which shows an engaging process between each of the connectors and each of the mating connectors in the insertion and withdrawal connector apparatus in accordance with the first embodiment of the invention, in which the slider is removed.

In FIGS. 14 and 15, under a state that each of the mating connectors 20 is attached to the frame 3, the connector 10 denoted by symbol [A] among the connectors denoted by symbols [A], [B], and [C] is received to a predetermined position of the receiving chamber 7. The connector 10 denoted by symbol [A] is inserted to the receiving chamber 7 and the projection 18a is positioned in an intermediate portion of the projection moving window 25.

The connector 10 denoted by symbol [B] is shown under a state that it is moved to a position immediately before the contact 11 is brought into contact with the contact 21. The connector 10 denoted by symbol [C] is shown under a state in which the engagement portion 10b is engaged with the mating connector 20b and the contact 11 is brought into contact with the mating contact 21.

Figure 10:
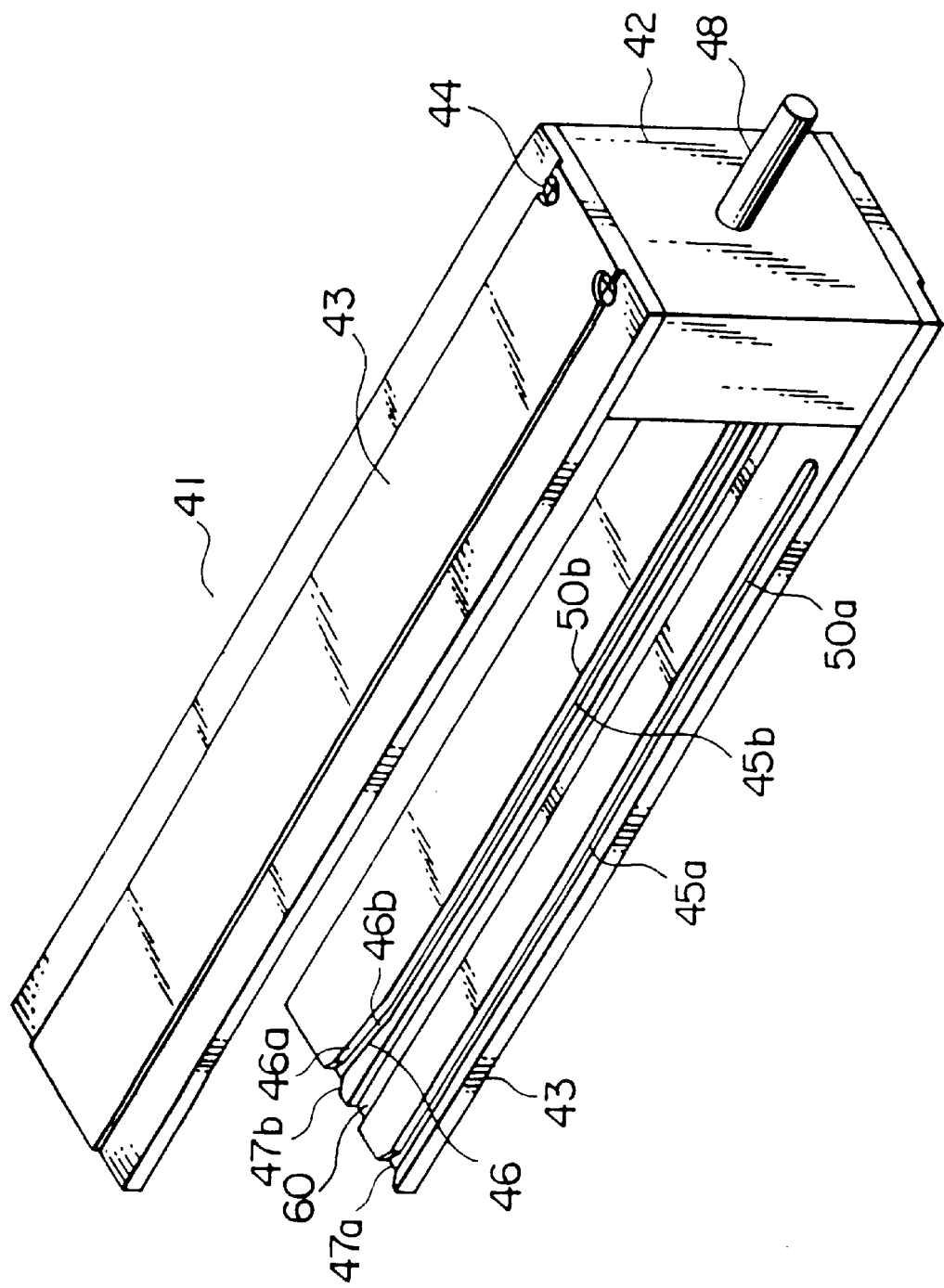
FIG. 10 is a perspective view of a slider in the insertion and withdrawal connector apparatus in accordance with the first embodiment of the invention.

In order to move each of the connectors 10 from the state denoted by symbol [A] shown in FIGS. 14 and 15 to the engagement state shown by symbol [C], the slider 41 shown in FIG. 10 is used.

Firstly, in a plurality of projection window 55, the projection 19 of each of the mating connectors 20 is fitted into an inner portion inside each of the projection windows 55 and is positioned on a straight line in the longitudinal direction. Under this state, since each of the projections 19 is fitted to a pair of positions of each of the projection windows 55, each of the mating connectors 20 is held within the receiving chamber 7.

Next, the connector 10 denoted by symbol [A] is received to a predetermined position in the receiving chamber 7 and, as shown in FIG. 12, a pair of lances 5f and 5g can be interlocked with a pair of interlocking groove portions 10g. Further, each of the connectors 10 denoted by symbols [B] and [C] is received to a predetermined position in each of the receiving chamber 7, in the same manner as the connector 10 denoted by symbol [A].

Next, the slider 41 slides on the frame plate portion 3a in the longitudinal direction. Thereupon, the projections 18a and 18b in each of the connectors 10 and the projection 19 in each of the mating connectors 20 are respectively fitted to the projection inserting groove portions 47a and 47b in the slider 41 having a width larger than a diameter thereof and are respectively inserted into the first and the second sliding groove portions 50a and 50b, and each of the connectors 10 is successively engaged with each of the mating connectors 20 by driving the slider 41 in the longitudinal direction perpendicular to the inserting and withdrawing directions I and II.

An engagement between each of the connectors 10 and each of the mating connectors 20 is performed in the following manner. When the handle 48 mounted to the slider block 42 is pushed in one direction, the slider 41 is driven and a pair of slider plate portions 43 slide. In consequence, since each engagement inclined surface 46a of a pair of inclined groove portion 46 successively inserts a pair of projections 18a and 18b of each of the connectors 10 into each of the projection moving windows 25 so as to make each projection 18a, 18b approach to each projection 19, each of the connectors 10 is engaged with each of the mating connectors 20. After the engagement, a pair of projections 18a and 18b of each of the connectors 10 enter into each of the straight groove portions 45b of a pair of slider plate portions 43 and are thereby locked, and the projection 19 of each of the mating connectors 20 enters into each of the straight groove portions 45a of a pair of slider plate portions 43 and is thereby locked.

Figure 16:
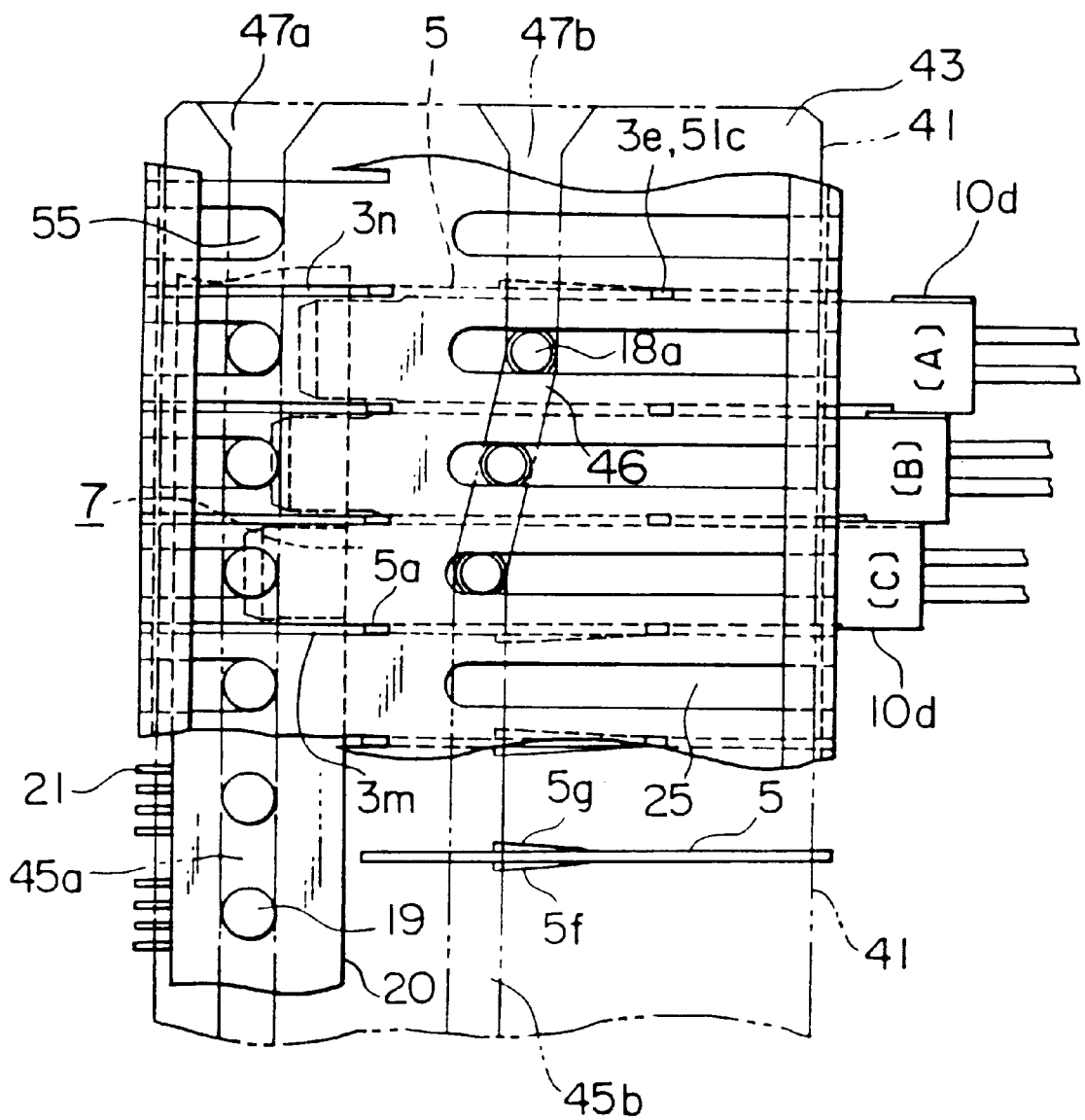
FIG. 16 is a plan view which shows an engaging process between each of the connectors and each of the mating connectors in the insertion and withdrawal connector apparatus in accordance with the first embodiment of the invention.

There will be understood a process in which, when each of the connectors 10 and each of the mating connectors 20 are engaged with each other by driving the slider 41, each of the connectors 10 is successively engaged with each of the mating connectors 20 by the inclined groove portion 46 of the slider 41, as shown in two dots chain line in FIG. 16.

A separation between each of the connectors 10 and each of the mating connectors 20 is performed in the following manner. When the handle 48 is pulled in the inverse direction, the slider 41 is driven and a pair of slider plate portions 43 slide. In consequence, since each separation inclined surface 46b of a pair of inclined groove portions 46 moves a pair of projections 18a and 18b in each of the connectors 10 so as to secede from a pair of projections 19, 19 of the mating connectors 20, each of the connectors 10 is separated from each of the mating connectors 20.

Figure 17:
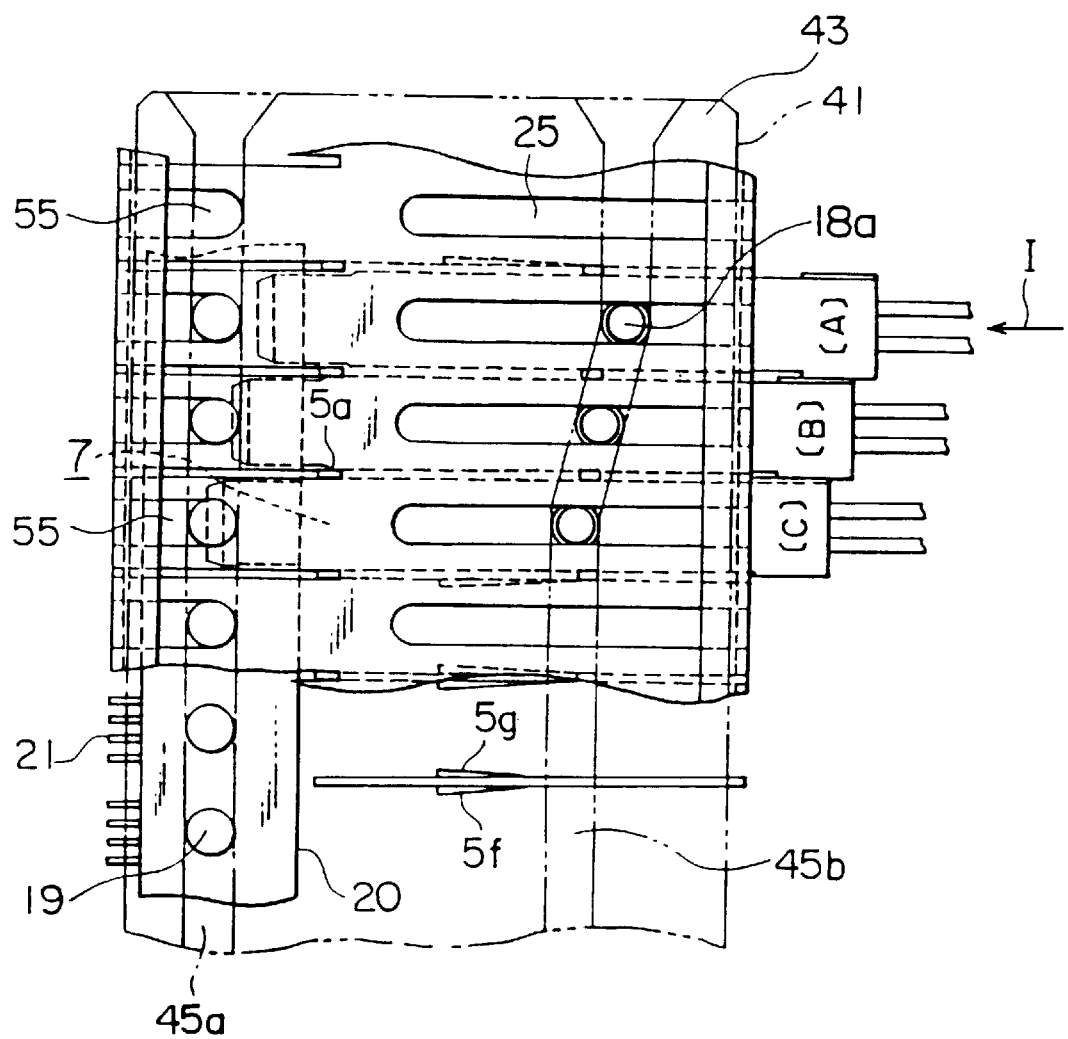
FIG. 17 is a plan view which shows an engaging process between each of the connectors and each of the mating connectors in the insertion and withdrawal connector apparatus in accordance with a modified example of the first embodiment of the invention.

FIG. 17 shows a modified example in which a position of each of the projections 18a and 18b is different from that of FIG. 16. In this example, each of the projection moving windows 25 long extends toward the inserting direction I from the position of each of the projections 18a and 18b at a position of the inserting direction I of each of the connectors 10, but since each of the projections 18a and 18b exists, each of the connectors 10 does not project forward from the engagement position even under a state that each of the mating connectors 20 does not exist. Further, each of the connectors 10 does not come out from each of the receiving chambers 7 and does not collide with each of the mating connectors 20 when engaging. The insertion and withdrawal connector apparatus in accordance with the first embodiment performs the following effects.

1. Since the lance formed in each of the partition members is interlocked with the interlocking groove portion formed in each of the connectors, an interval for arranging a plurality of connectors becomes narrow.

2. Since the convex portion is formed in each of the connectors, each of the connectors does not move beyond a predetermined position.

3. One kind of connector receiving body can correspond to several kinds of connectors in each of which a position to be provided with the projection is different.

Next, an insertion and withdrawal connector apparatus in accordance with a second embodiment of the invention will be described below with reference to FIGS. 18A to 20B. This insertion and withdrawal connector apparatus 66 is constituted by combining a plurality of connectors 61, a first frame 62, a second frame 63, a first slider 64, a second slider 65 and the like. Incidentally, the connector 61 is a cable connector used for connecting a cable in the illustrated embodiment.

Each of the connectors 61 has a first projection 61a and a second projection 61b formed substantially in a cylindrical shape. Further, the first frame 62 and the second frame 63 respectively have a first holding groove 62a and a second holding groove 63a extending along the first x-direction. Still further, the first slider 64 and the second slider 65 respectively have a first cam groove 64a and a second cam groove 65a.

Figure 20A:
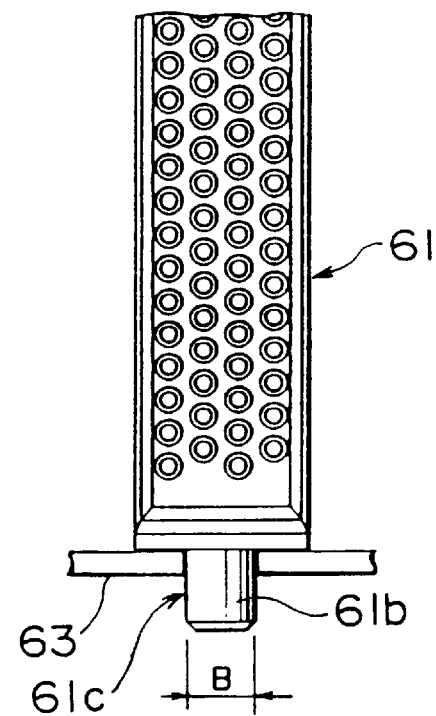
FIG. 20A is a front view of a main portion of a connector in the insertion and withdrawal connector apparatus in accordance with the second embodiment of the invention.
Figure 20B:
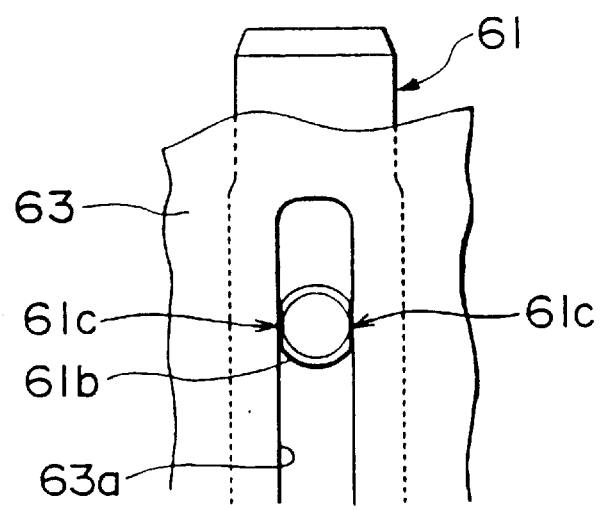
FIG. 20B is a bottom view of the main portion of the connector in the insertion and withdrawal connector apparatus in accordance with the second embodiment of the invention.

Here, a diameter of the first projection 61a and a diameter of the second projection 61b are mutually equal to each other, but one of the first projection 61a and the second projection 61b has a recess portion. In this embodiment, with reference to FIGS. 20A and 20B, both sides in a diametrical direction of the cylinder of the projection 61b, that is, a portion facing an edge of the second holding groove 63a in FIG. 20B is a recess portion 61c. Due to presence of the recess portion 61c, a width B of the second projection 61b in the widthwise direction of the second holding groove 63a is smaller than a diameter A of the first projection 61a. Incidentally, the recess portion 61c may be integrally formed when forming the second projection 61b, or may be formed by a cutting process after forming the cylindrical second projection 61b.

The first projection 61a and the second projection 61b in each of the connectors 61 are respectively inserted slidably into the first holding groove 62a in the first frame 62 and the second holding groove 63a in the second frame 63. Further, the first projection 61a and the second projection 61b are respectively inserted into the first cam groove 64a in the first slider 64 and the second cam groove 65a in the second slider 65. By this structure, the connectors 61 are respectively held by the first frame 62 and the second frame 63 so as to be movable in a first direction x. And, the connectors 61 are respectively driven along the first direction x by the first slider 64 and the second slider 65 integrally moving along a second direction y.

As shown in FIGS. 19A and 19B, positions of the projections 61a, 61b, 61a', and 61b' are different between the connector 61 disposed in a right side of the first frame 62 and the second frame 63 and the connector 61' disposed in a left side thereof. That is, in the connector 61, the projections 61*a* and 61*b* are in front of the engagement direction thereof, but in the connector 61', the projections 61*a*' and 61*b*' are disposed at the rear thereof. Further, the first slider 64 and the second slider 65 have first to fourth cam grooves 64*a*, 65*a*, 64*b* and 65*b* for the connector 61 and first to fourth cam grooves 64*a*', 65*a*', 64*b*', and 65*b*' for the connector 61'. The first to fourth cam grooves 64*a*, 65*a*, 64*b*, and 65*b* are formed so as to correspond to the connector 61, and the first to fourth cam grooves 64*a*', 65*a*', 64*b*', and 65*b*', are formed so as to correspond to the connector 61'. Except the points mentioned above, the projections 61*a* and 61*b* and the projections 61*a*' and 61*b*', and the first to fourth cam grooves 64*a*, 65*a*, 64*b*, and 65*b* and the first to fourth cam grooves 64*a*', 65*a*', 64*b*', and 65*b*' are substantially constituted in the same manner.

A width of one of the first holding groove 62*a* in the first frame 62 and the second holding groove 63*a* in the second frame 63, that is, a width of the second holding groove 63*a* in this embodiment is formed so as to be narrower than a width of the first holding groove 62*a* in correspondence to a width of the second projection 61*b*.

Further, the first slider 64 and the second slider 65 are provided so as to be movable in the second direction y with respect to the first frame 62 and the second frame 63. Further, the first cam groove 64*a* in the first slider 64 and the second cam groove 65*a* in the second slider 65 respectively receive slidably the first projection 61*a* and the second projection 61*b*. Further, the widths of the first cam groove 64*a* and the second cam groove 65*a* are formed so as to be mutually equal.

Figure 18A:
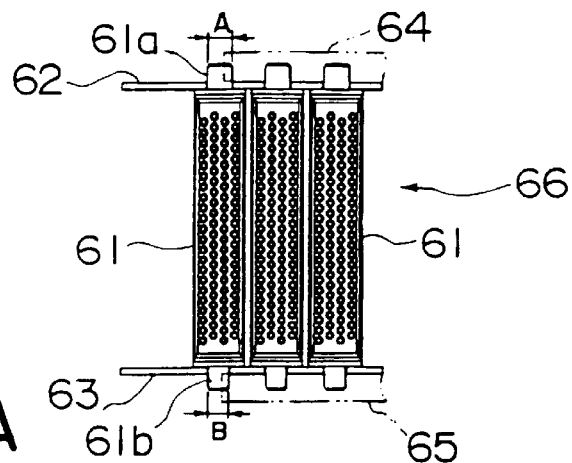
FIG. 18A is a front view of a main portion of an insertion and withdrawal connector apparatus in accordance with a second embodiment of the invention.
Figure 18B:
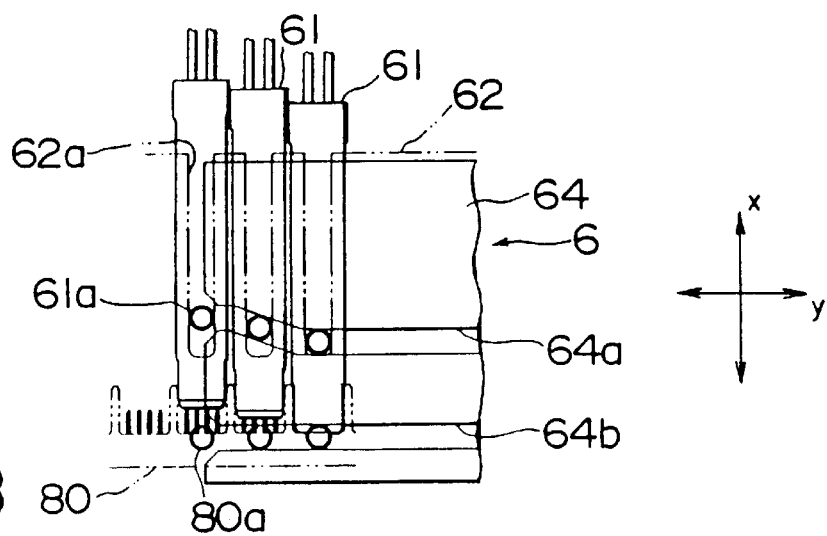
FIG. 18B is a plan view of the main portion of the insertion and withdrawal connector apparatus in accordance with the second embodiment of the invention.
Figure 18C:
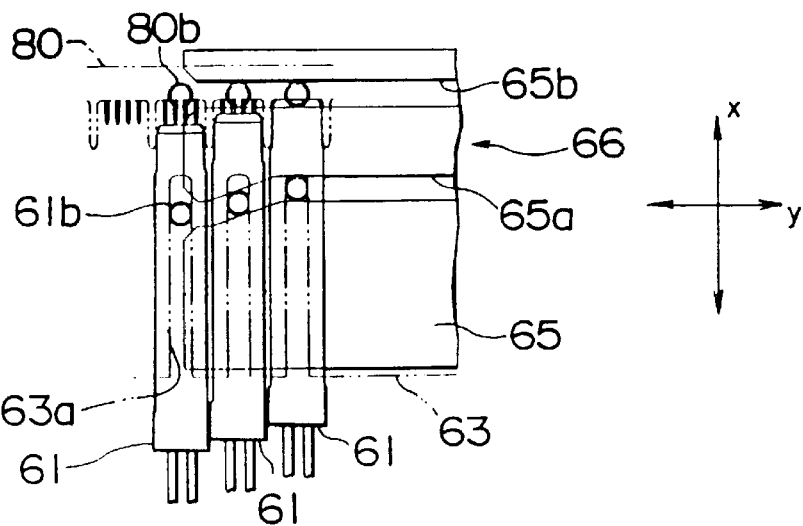
FIG. 18C is a bottom view of the main portion of the insertion and withdrawal connector apparatus in accordance with the second embodiment of the invention.

Still further, in FIGS. 18B and 18C, reference numeral 80 denotes a pin header in which a pin contact connecting each of the connectors 61 is provided. The pin header 80 has a third projection 80*a* and a fourth projection 80*b*. And, the third cam groove 64*b* formed in the first slider 64 receives the third projection 80*a* and is in contact therewith. Further, the fourth cam groove 65*b* formed in the second slider 65 receives the fourth projection 80*b* and is in contact therewith. Accordingly, the pin header 80 interlocks with the first slider 64*f* and the second slider 65, and a positional relation between the first slider 64, the second slider 65, and the pin header 80 can be maintained when engaging and separating between the connectors 61 and the pin header 80.

Furthermore, in FIGS. 19A and 19B, reference numerals 67 and 68 denote a first block and a second block for combining the first frame 62 and the second frame 63.

In the insertion and withdrawal connector apparatus in accordance with the second embodiment, the first holding groove 62*a* corresponding to the first projection 61*a* is formed in the first frame 62 and the second holding groove 63*a* corresponding to the second projection 61*b* is formed in the second frame 63. Accordingly, even in case of inserting the connector 61 in an erroneous direction, for example, in FIG. 18A, inserting the connector 61 to the first frame 62 and the second frame 63 under a state of placing the second projection 61*b* to the upper side and placing the first projection 61*a* to the lower side, the first projection 61*a* can not pass through the second holding groove 63*a* in the second frame 63 due to excessive narrowness. Therefore, the connector 61 can be prevented from being erroneously inserted.

And, as mentioned above, an engagement operation of each of the connectors 61 can be performed by moving the first projection 61*a* and the second projection 61*b* in the upper and lower portions of each of the connectors 61 by the cam groove 64*a* in the first slider 64 and the cam groove 65*a* in the second slider 65 under a state of holding each of the connectors 61 by the first frame 62 and the second frame 63. That is, each of the connectors 61 is engaged with the pin header 80 by moving the first slider 64 and the second slider 65 in a leftward direction in FIGS. 18B and 18C, so that the contact in each of the connectors 61 can be connected to the corresponding pin contact of pin header 80.

Next, an insertion and withdrawal connector apparatus in accordance with a third embodiment of the invention will be described below with reference to FIGS. 21A and 21B.

In an insertion and withdrawal connector apparatus 66 in accordance with a third embodiment, an arrangement of the frames 62 and 63 is the same as the insertion and withdrawal connector apparatus in accordance with the second embodiment shown in FIGS. 18A to 20B. However, in the insertion and withdrawal connector apparatus in accordance with the third embodiment, the connector 61 is arranged in a left side of the frames 62 and 63, the connector 61' is arranged in a right side thereof, and the sliders 64 and 65 are arranged in a left side of the frames 62 and 63. In these points, this apparatus is different from the insertion and withdrawal connector apparatus 66 in accordance with the second embodiment. And, the upper and lower positions of the sliders 64 and 65 become reverse to the insertion and withdrawal connector apparatus 66 in accordance with the second embodiment.

That is, in the insertion and withdrawal connector apparatus 66 in accordance with the third embodiment, since a width of the cam groove 64*a* in the first slider 64 and a width of the cam groove 65*a* in the second slider 65 are equal, the structure is made so as to arrange the second slider 65 in the first frame 62 side and the first slider 64 in the second frame 63 side.

Incidentally, in case of the insertion and withdrawal connector apparatus 66 in accordance with the third embodiment, an engagement operation of the connector 61 becomes reverse to that of the insertion and withdrawal connector apparatus 66 in accordance with the second embodiment. That is, with reference to FIGS. 21A and 21B, the engagement operation is performed by moving the first slider 64 and the second slider 65 from left to right. In this manner, in accordance with the second embodiment and the third embodiment of the invention, a mounting direction of the first slider 64 and the second slider 65 with respect to the first frame 62 and the second frame 63 can be suitably determined as occasion demands.

Figure 22A:
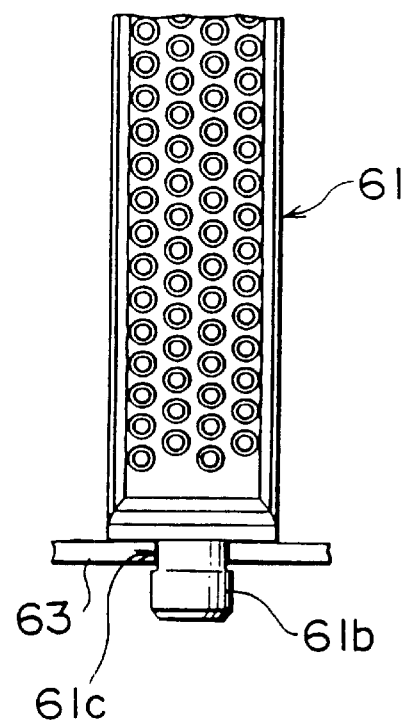
FIG. 22A is a front view of a main portion of a connector in an insertion and withdrawal connector apparatus in accordance with a fourth embodiment of the invention.
Figure 22B:
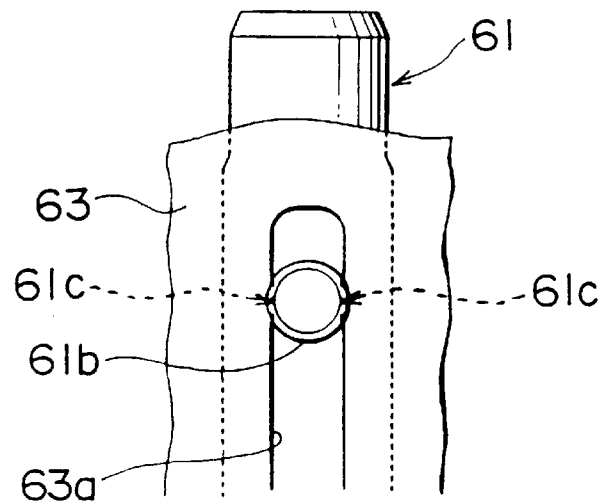
FIG. 22B is a bottom view of the main portion of the connector in the insertion and withdrawal connector apparatus in accordance with the fourth embodiment of the invention.
Figure 23A:
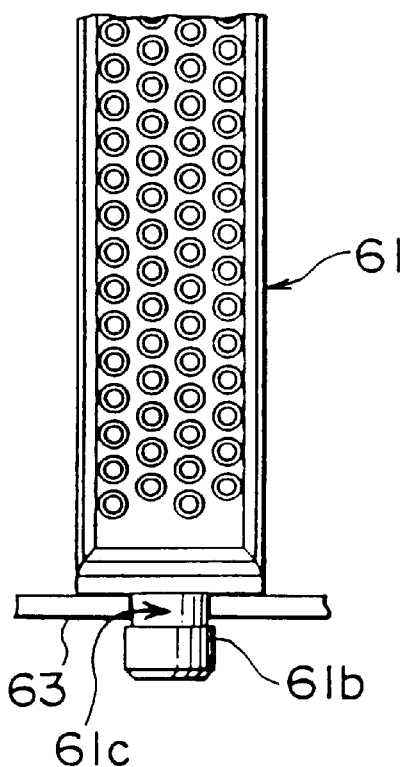
FIG. 23A is a front view of a main portion of a connector in an insertion and withdrawal connector apparatus in accordance with a fifth embodiment of the invention.
Figure 23B:
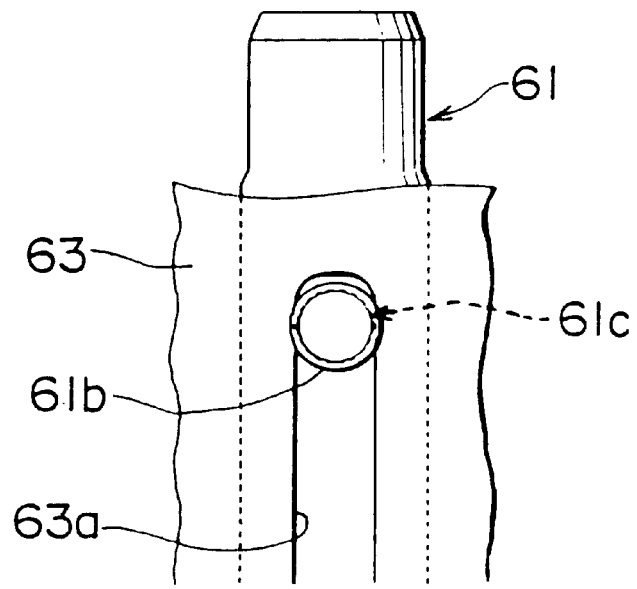
FIG. 23B is a bottom view of the main portion of the connector in the insertion and withdrawal connector apparatus in accordance with the fifth embodiment of the invention.

An insertion and withdrawal connector apparatus in accordance with a fourth embodiment of the invention is shown in FIGS. 22A and 22B. In this insertion and withdrawal connector apparatus, a recess portion 61*c* is formed in a part of a surface in each of root portions of the first projection 61*a* and the second projection 61*b* in the widthwise direction in each of the first holding groove 62*a* and the second holding groove 63*a*. Incidentally, since the other structures and the operation of the insertion and withdrawal connector apparatus are the same as those of the second embodiment mentioned above, the description is omitted.

An insertion and withdrawal connector apparatus in accordance with a fifth embodiment is shown in FIGS. 22A and 22B. In this insertion and withdrawal connector apparatus, a recess portion 61*c* is formed in all the periphery of the surface of each of the root portions of the first projection 61*a* and the second projection 61*b* in each of the widthwise directions of the first holding groove 62*a* and the second holding groove 63*a*. Incidentally, since the other structures and the operation of the insertion and withdrawal connector apparatus are the same as those of the second embodiment mentioned above, the description is omitted.

The insertion and withdrawal connector apparatuses in accordance with the second to fifth embodiments can prevent each of the connectors from being erroneously inserted into each of the frames without changing the width of the cam groove in each of the sliders.

Successively, a structure for remote-controlling engagement and separation of an insertion and withdrawal connector apparatus in accordance with a sixth embodiment of the invention will be described below with reference to FIGS. 24 to 29.

Figure 24:
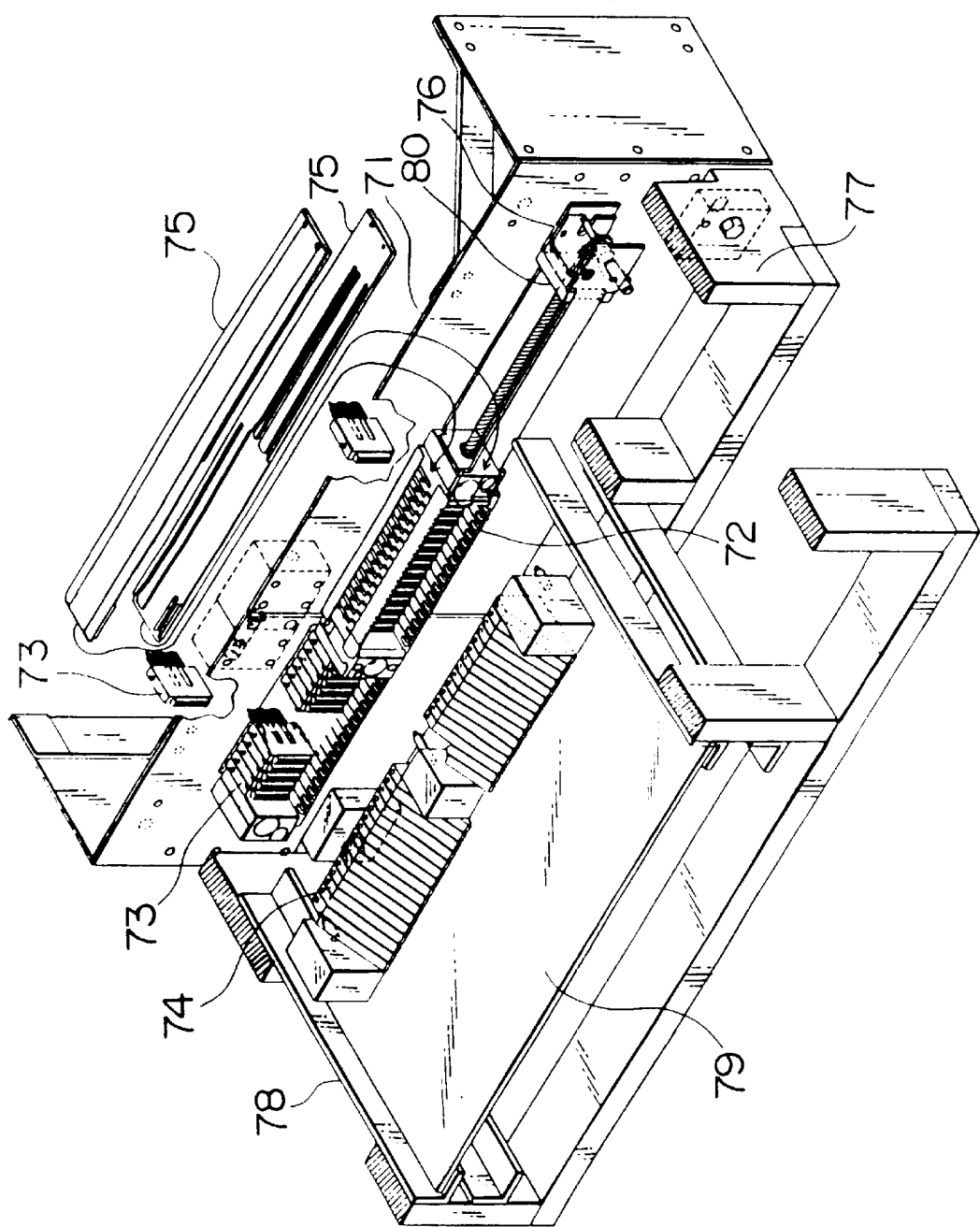
FIG. 24 is a perspective view of an insertion and withdrawal connector apparatus, in accordance with a sixth embodiment of the invention, in which there is used a structure for remote-controlling engagement and separation.

At first, a total structure of the sixth embodiment will be described below with reference to FIG. 24. A relay frame 72 is fixed to a front surface of a wired casing 71, and the relay frame 72 holds a multiplicity of aligned cable connectors 73. Incidentally, two cable connectors 73 are picked up and shown in an upper portion in FIG. 24 for the sake of understanding. A pair of sliders 75 (in FIG. 24, shown by picking up for the sake of understanding) for engaging and separating a multiplicity of cable connectors 73 with respect to a multiplicity of aligned front connectors 74 are attached to the relay frame 72, and a gear box 76 for sliding a pair of sliders 75 is attached to the wired casing 71.

A cage 77 is fixed to a front surface of the wired casing 71, and a pair of rails 78 of ten plus several steps (in FIG. 24, a first step and a second step from the bottom are shown and a third step and more are omitted) are fixed to the cage 77. A printed wiring board 79 is mounted on a pair of rails 78 in the second step from the bottom, and a multiplicity of aligned front connectors 74 are mounted on the printed wiring board 79.

Since ten plus several sheets of printed wiring board 79 are mounted on the cage 77, a sufficient rigidity is required for the cage 77 and the wired casing 71, so that it is hard to punch a hole on a side surface plate of the cage 77 or take off the side surface plate of the cage 77 in order to operate a pair of sliders 75. Thus, as described below with reference to FIGS. 25 to 29, engagement and separation between a multiplicity of cable connectors 73 and a multiplicity of front connectors 74 are performed by a remote operation structure.

Figure 25:
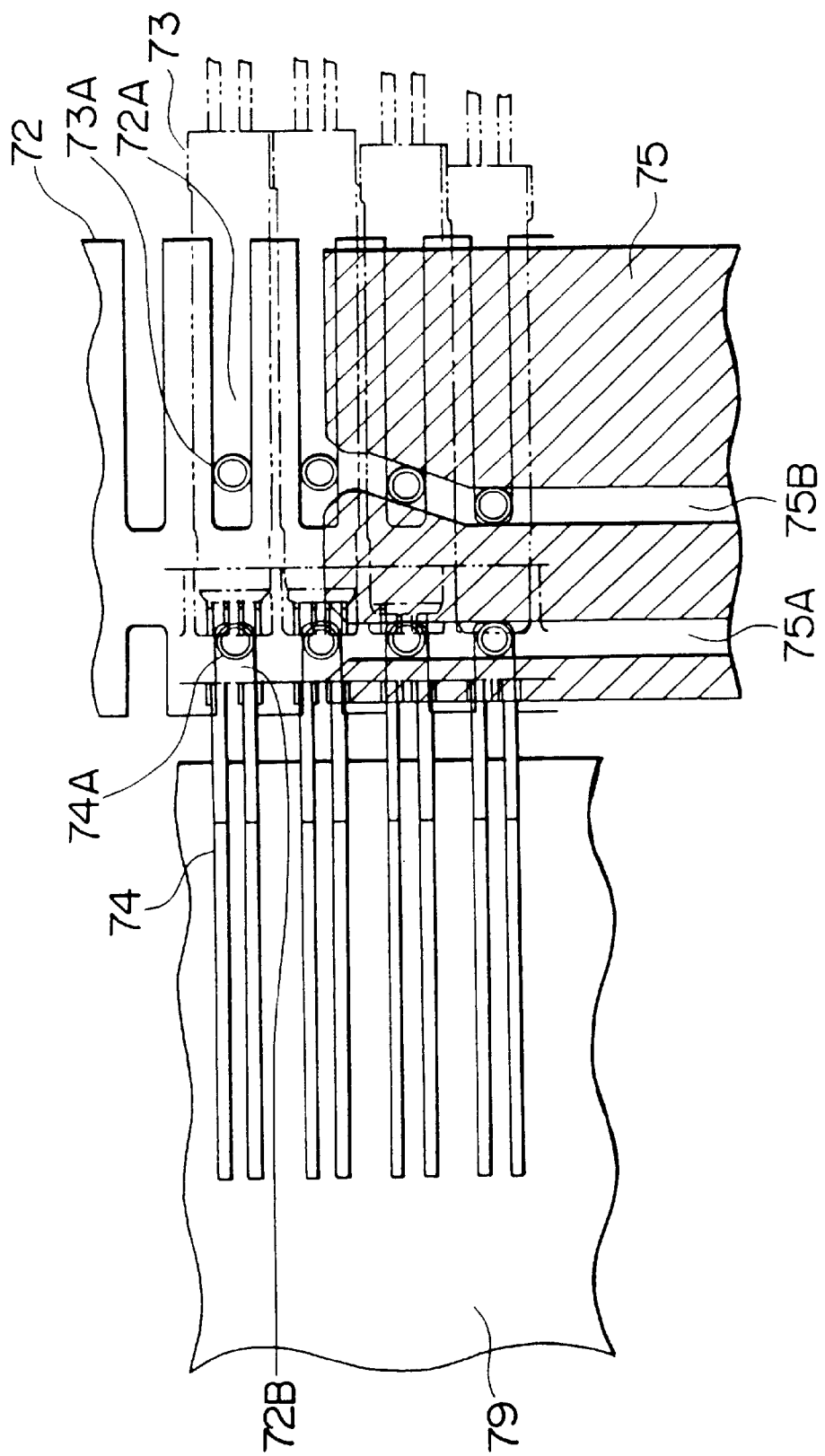
FIG. 25 is a plan view which shows a relation between a slider slid by the structure for remote-controlling engagement and separation in the insertion and withdrawal connector apparatus in accordance with the sixth embodiment of the invention, and each of cable connectors and each of front connectors.
Figure 27A:
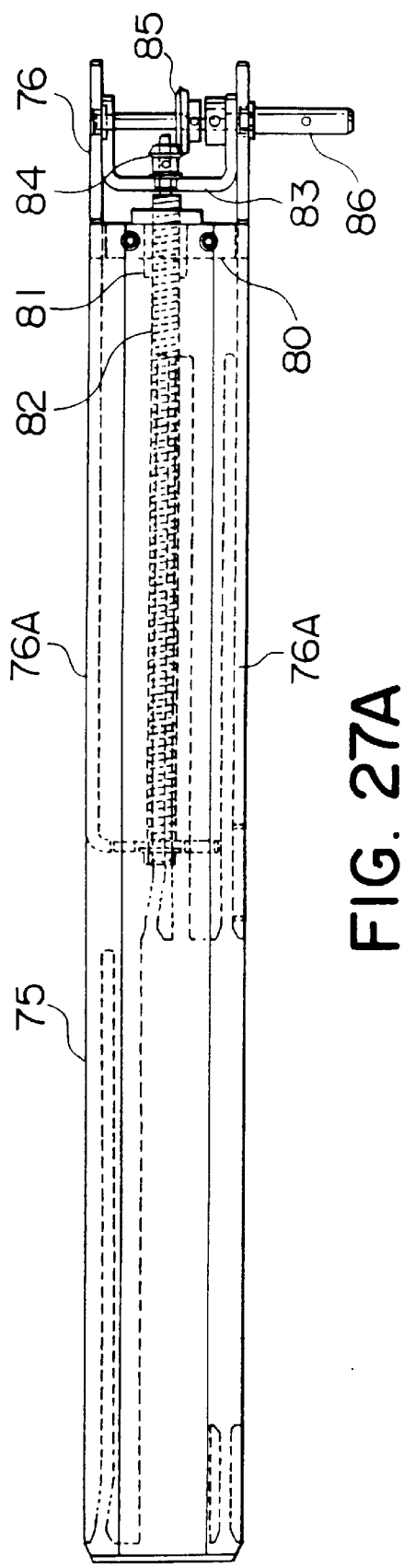
FIG. 27A is a plan view of the slider slid by the structure for remote-controlling engagement and separation in the insertion and withdrawal connector apparatus in accordance with the sixth embodiment of the invention, and a drive mechanism therefor.
Figure 27B:
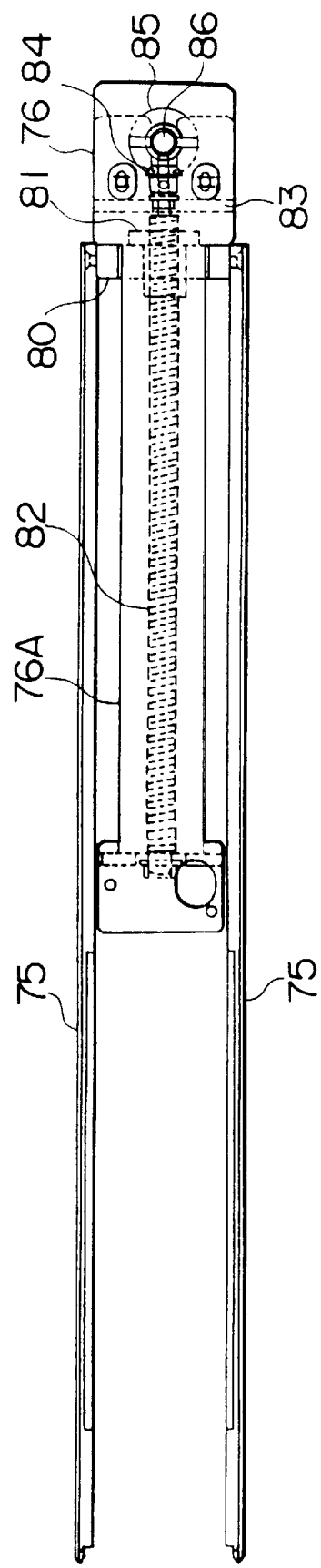
FIG. 27B is a front view of the slider slid by the structure for remote-controlling engagement and separation of the insertion and withdrawal connector apparatus in accordance with the sixth embodiment of the invention, and the drive mechanism therefor.
Figure 28A:
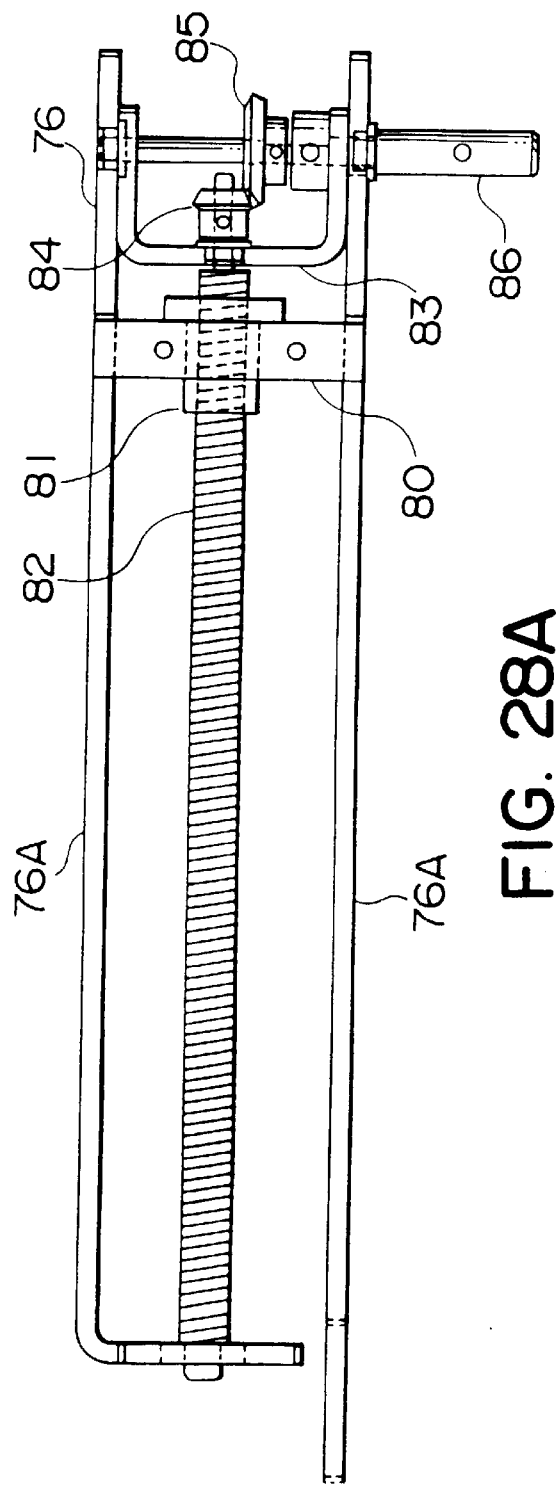
FIG. 28A is a plan view of the drive mechanism for the slider in the structure for remote-controlling engagement and separation of the insertion and withdrawal connector apparatus in accordance with the sixth embodiment of the invention.
Figure 28B:
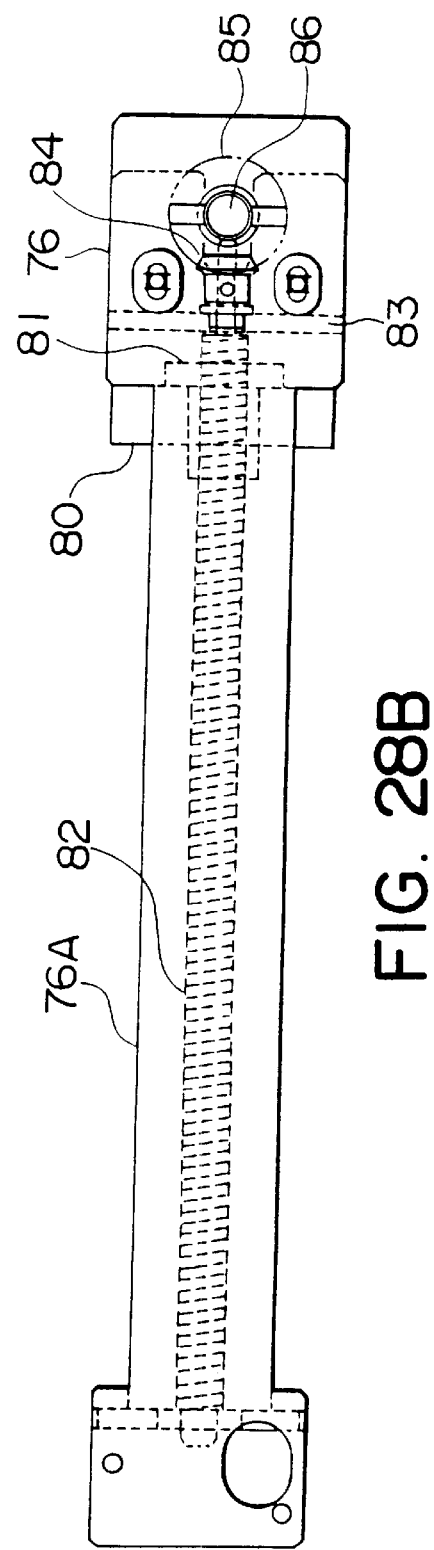
FIG. 28B is a front view of the drive mechanism for the slider in the structure for remote-controlling engagement and separation of the insertion and withdrawal connector apparatus in accordance with the sixth embodiment of the invention.

Next, engagement and separation between a multiplicity of cable connectors 73 and a multiplicity of front connectors 74 by a pair of sliders 75 will be described below with reference to FIGS. 25 and 26. Incidentally, as shown in FIG. 24 (showing a state in which a multiplicity of aligned front connectors 74 are apart from a multiplicity of cable connectors 73 for the sake of understanding) to FIG. 26, each one of the sliders 75 is slidably mounted to both upper and lower sides of the relay frame 72.

Respective grooves 72A to which projections 73A of a multiplicity of cable connectors 73 fit, and respective grooves 72B to which projections 74A of a multiplicity of front connectors 74 fit are provided in the relay frame 72. A direction of each of the groove 72A and a direction of each of the grooves 72B are perpendicular to a sliding direction of a pair of sliders 75. A multiplicity of cable connectors 73 can move along each of the grooves 72A, and a multiplicity of front connectors 74 can move along each of the grooves 72B. The printed wiring board 79 on which a multiplicity of front connectors 74 are mounted is inserted into the cage 77 to a position at which each of the projections 74A in a multiplicity of front connectors 74 completely fits to each of the grooves 72B in the relay frame 72. Thereafter, a pair of sliders 75 are inserted into the relay frame 72.

A linear groove 75A in the sliding direction and a groove 75B parallel to the groove 75A until the midway and having an end portion inclined to the sliding direction are provided in the slider 75. Each of the projections 74A in each of both upper and lower sides in a multiplicity of front connectors 74 can fit to the groove 75A in the slider 75, and each of the projections 73A in each of both upper and lower sides in a multiplicity of cable connectors 73 can fit to the groove 75B in the slider 75.

An upper view in FIG. 26 shows a state in which a multiplicity of cable connectors 73 are engaged with a multiplicity of front connectors 74, and a lower view in FIG. 26 shows a state in which a multiplicity of cable connectors 73 are not engaged with a multiplicity of front connectors 74. A moving amount of the cable connector 73 with respect to the front connector 74 is expressed by x.

Successively, a drive mechanism for a pair of sliders 75 will be described below with reference to FIGS. 27A to 29. Each one of the drive mechanisms is independently provided in each one of the print wiring boards 79.

Each end of a pair of sliders 75 is fixed to both upper and lower sides of a slide plate 80. The slide plate 80 can slide along guide plates 76A disposed in both sides and integrally structured with the gear box 76. The slide plate 80 is fixed to a synthetic resin nut 81, and the nut 81 is fitted to a metal screw shaft 82. A portion near an end portion of the screw shaft 82 is rotatably supported to a bracket 83 fixed within the gear box 76, the other end portion of the screw shaft 82 is rotatably supported to the guide plate 76A at one side, and further a bevel gear 84 is fixed to the one end portion of the screw shaft 82.

The bevel gear 84 is meshed with a bevel gear 85 within the gear box 76, and the bevel gear 85 is fixed to a drive shaft 86 rotatably supported to the gear box 76. The drive shaft 86 is rotated by a handle 87 detachably mounted thereto.

A drive operation of a pair of sliders 75 in case of engaging a multiplicity of aligned cable connectors 73 with a multiplicity of aligned front connectors 74 will be described below. When the handle 87 is rotated in one direction, the screw shaft 82 is rotated through the drive shaft 86, the bevel gear 85, and the bevel gear 84. In consequence, the slide plate 80 fixed to the nut 81 slides leftward along the guide plates 76A disposed in both sides from a position shown in FIGS. 27A to 28B through a position shown in FIG. 29. Accordingly, a pair of sliders 75 fixed to the sliding plate 80 slide leftward, and do not move a multiplicity of aligned front connectors 74 having each of the projections 74A fitted to the linear groove 75A, but successively move a multiplicity of aligned cable connectors 73 having each of the projections 73A fitted to a portion inclined to a sliding direction of the groove 75B. Accordingly, each of the cable connectors 73 is successively fitted to each of the front connectors 74.

In case of separating the cable connectors 73 from each of the front connector 74, an operation reverse to the operation mentioned above is performed.

As is apparent from the description mentioned above, in accordance with the sixth embodiment, the following effects can be obtained.

1. Since the remote controlling structure is adopted, the insertion and withdrawal connector apparatus can be engaged and separated without disassembling after assembling the cage and the wired casing.

2. Since a rotational speed and a torque of the screw shaft required for engaging and separating the insertion and withdrawal connector apparatus can be optionally obtained by modifying a combination of parts within the gear box such as changing a gear ratio of the bevel gear and changing a lead length of the screw shaft, it is not necessary to modify a metal mold for a pair of sliders and to change a design of each of the connectors, so that a cost therefor becomes inexpensive.

3. A drive mechanism for a pair of sliders is made simple and compact.

Further, a connecting frame block structure in accordance with a seventh embodiment of the invention will be described below with reference to FIGS. 30A to 36C.

Figures 30A, 30B:
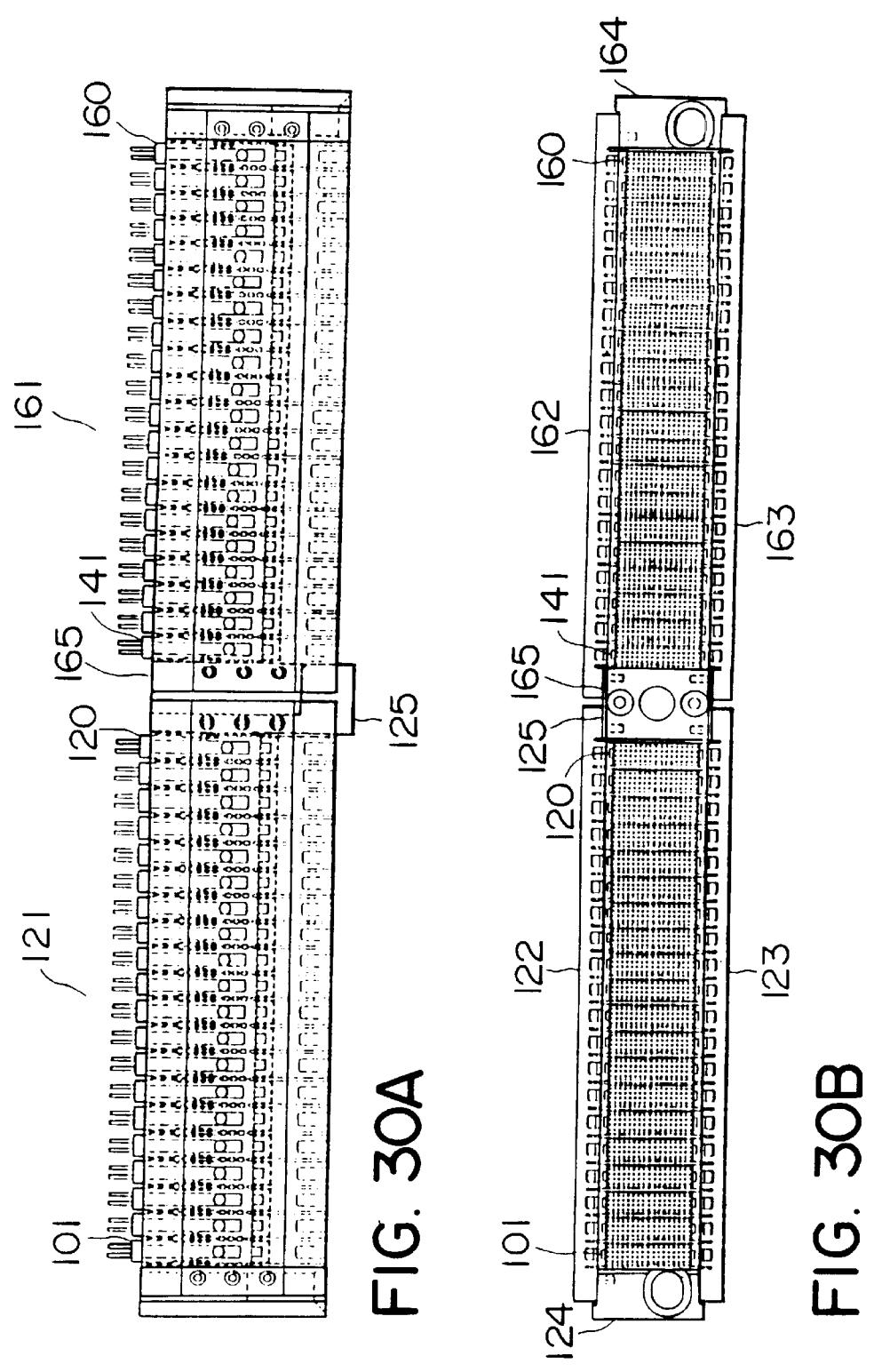
Figure 31A:
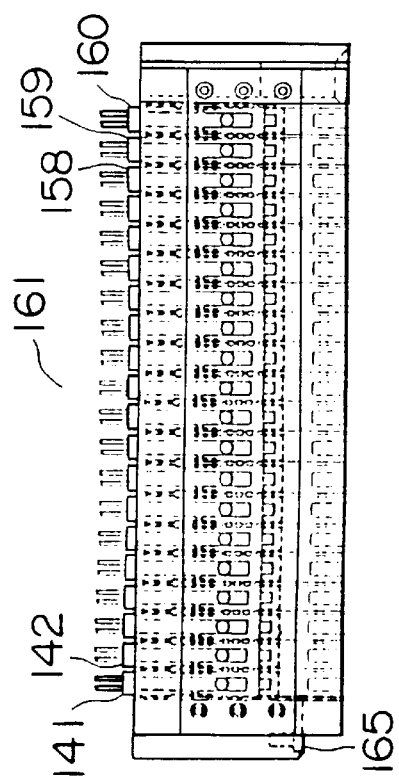
FIG. 31A is a front view of one of the insertion and withdrawal connector apparatuses before being connected by the connection frame block structure in accordance with the seventh embodiment of the invention.
Figure 31B:
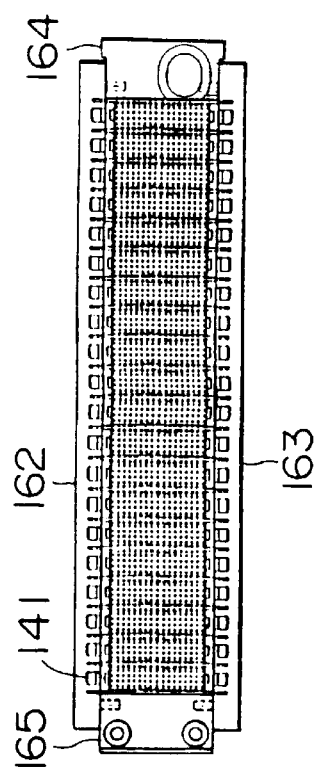
FIG. 31B is a plan view of one of the insertion and withdrawal connector apparatuses before being connected by the connection frame block structure in accordance with the seventh embodiment of the invention.
Figure 31C:
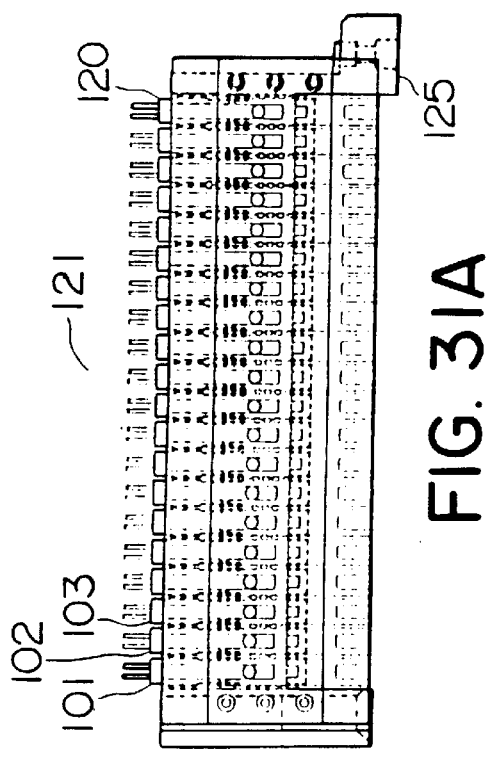
FIG. 31C is a front view of the other of the insertion and withdrawal connector apparatuses before being connected by the connection frame block structure in accordance with the seventh embodiment of the invention.
Figure 31D:
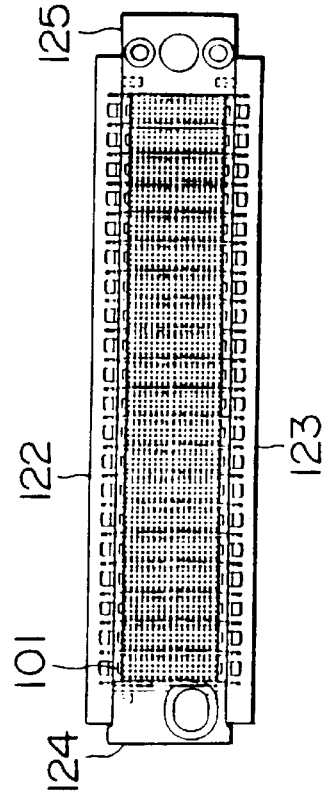
FIG. 31D is a plan view of the other of the insertion and withdrawal connector apparatuses before being connected by the connection frame block structure in accordance with the seventh embodiment of the invention.

At first, two insertion and withdrawal connector apparatuses connected by the connecting frame block structure in accordance with the seventh embodiment will be described below with reference to FIGS. 30A to 31D. As shown in FIGS. 31C and 31D, a plurality (in this case twenty) of cable connectors 141 to 160 are combined to a single second insertion and withdrawal connector apparatus 161 by a frame 162, a frame 163 and a frame block 164. Similarly, as shown in FIGS. 31A and 31B, a plurality (in this case twenty) of cable connectors 101 to 120 are combined to a single first insertion and withdrawal connector apparatus 121 by a frame 122, a frame 123 and a block 124. And, the first insertion and withdrawal connector apparatus 121 and the second insertion and withdrawal connector apparatus 161 are connected by a first connecting frame block 125 and a second connecting frame block 165, thereby constituting a single insertion and withdrawal connector apparatus, as shown in FIGS. 30A and 30B.

Figure 32A:
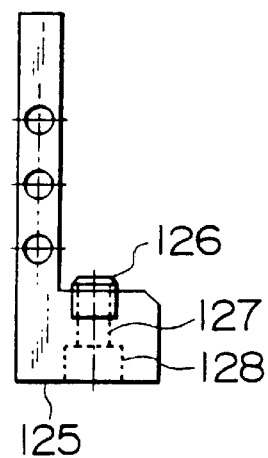
FIG. 32A is a front view of a first connection frame block in the connection frame block structure in accordance with the seventh embodiment of the invention.
Figure 32B:
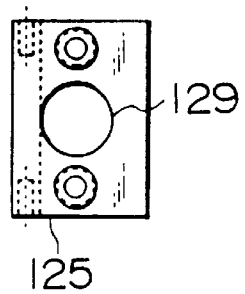
FIG. 32B is a plan view of the first connection frame block in the connection frame block structure in accordance with the seventh embodiment of the invention.
Figure 32C:
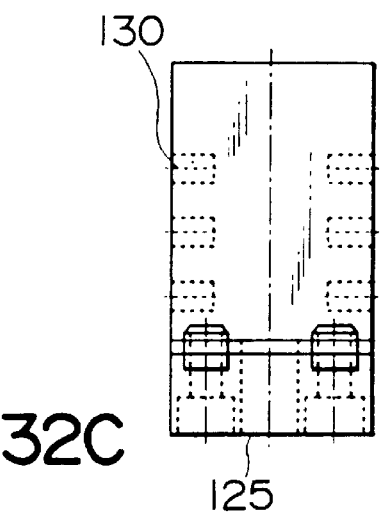
FIG. 32C is a side view of the first connection frame block in the connection frame block structure in accordance with the seventh embodiment of the invention.

Next, the first connecting frame block 125 will be described below with reference to FIGS. 32A to 32C. Two guide pipes 126 are pressed into the first connection frame block 125, a through hole 127 for the fixing screw and a spot facing hole 128 for the fixing screw head are bored coaxially with each of the guide pipes 126, and a connector engaging guide hole 129 is bored in an intermediate portion of two guide pipes 126. On both front and rear surfaces of the first connection frame block 125, each three total six frame fixing screw holes 130 are bored for fixing a frame 122 and a frame 123.

Figure 33A:
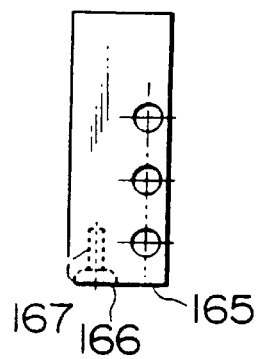
FIG. 33A is a front view of a second connection frame block in the connection frame block structure in accordance with the seventh embodiment of the invention.
Figure 33B:
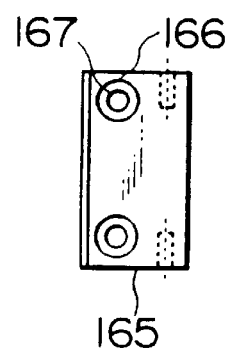
FIG. 33B is a plan view of the second connection frame block in the connection frame block structure in accordance with the seventh embodiment of the invention.
Figure 33C:
FIG. 33C is a side view of the second connection frame block in the connection frame block structure in accordance with the seventh embodiment of the invention.

Subsequently, the second frame connection block 165 will be described below with reference to FIGS. 33A to 33C. Two guide holes 166 corresponding to two guide pipes 126 in the first connection frame block 125 are bored in the second connection frame block 165, and a fixing screw hole 167 is bored coaxially with each of the guide holes 166. On both front and rear surfaces of the second connection frame block 165, each three total six frame fixing screw holes 168 are bored for fixing a frame 162 and a frame 163.

Figure 34A:
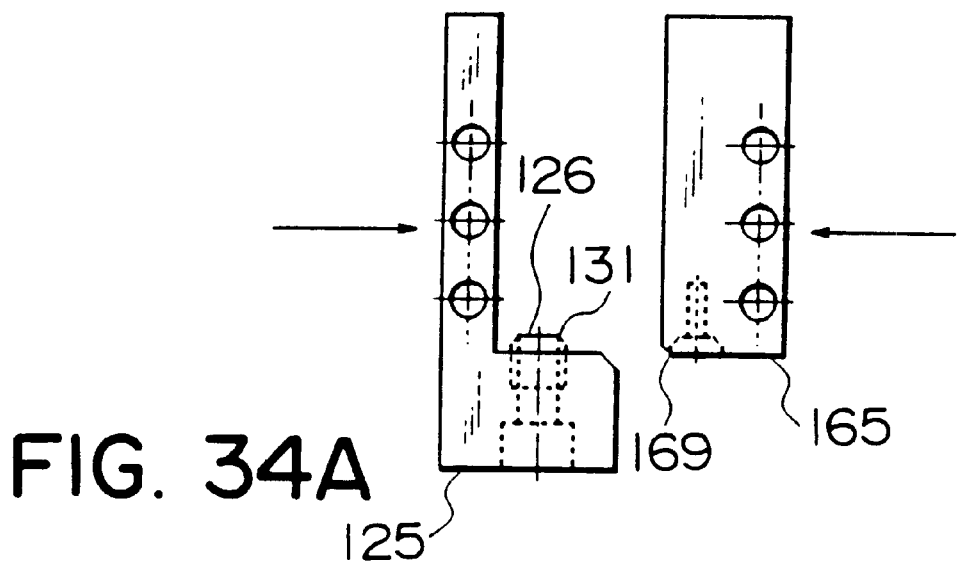
FIG. 34A is a front view of the first connection frame block and the second connection frame block in the connection frame block structure in accordance with the seventh embodiment of the invention.
Figure 34B:
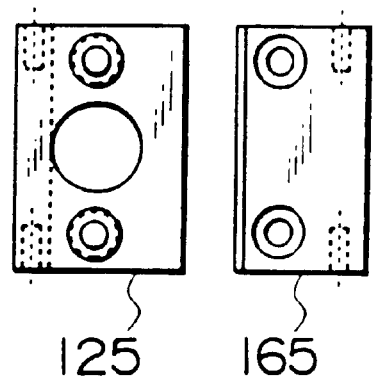
FIG. 34B is a bottom view of the first connection frame block and the second connection frame block in the connection frame block structure in accordance with the seventh embodiment of the invention.
Figures 35A, 35B:
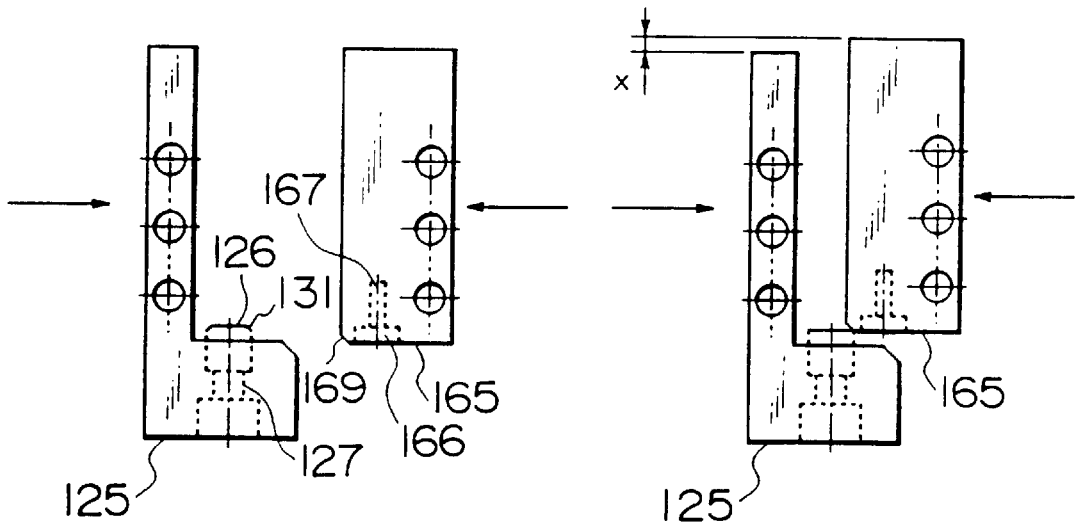
FIG. 35A is a front view of a first step of a connection sequence between the first connection frame block and the second connection frame block in the connection frame block structure in accordance with the seventh embodiment of the invention.
FIG. 35B is a front view of a second step of the connection sequence.
Figures 35C, 35D:
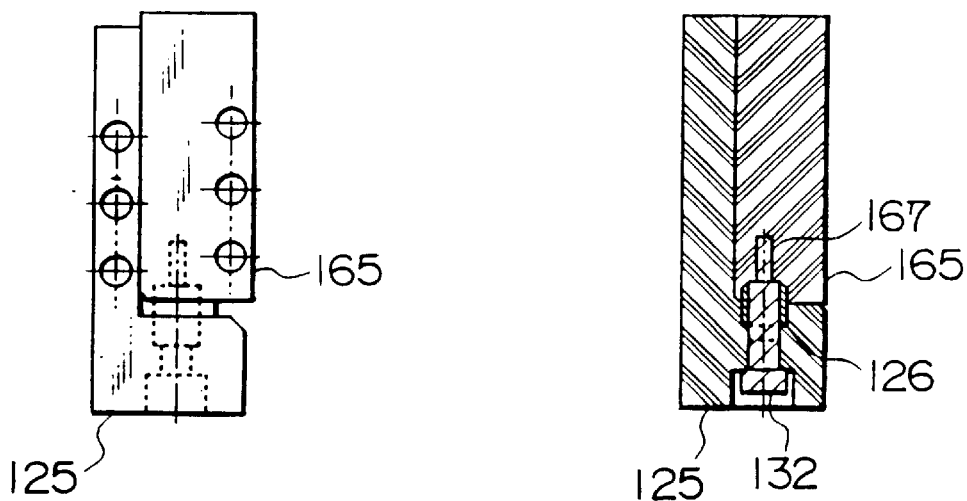
FIG. 35C is a front view of a third step of the connection sequence.
FIG. 35D is a sectional view of a fourth step of the connection sequence.

FIGS. 34A and 34B show a state of the first connection frame block 125 and the second connection frame block 165 picked up from FIGS. 31A to 31D. Since the second connection frame block 165 rides over each of the guide pipes 126 only by moving the first connection frame block 125 and the second connection frame block 165 in a direction of an arrow due to an introduction by a beveling 131 at a front end of each of the guide pipes 126 and a beveling 169 at a corner of a connection starting surface between the second connection frame block 165 and a front end of each of the guide pipes 126, the first connection frame block 125 and the second connecting frame block 165 can be connected.

FIGS. 35A to 36D show a connecting sequence between the first connection frame block 125 and the second connection frame block 165.

A. The first connection frame block 125 and the second connection frame block 165 are respectively moved in a direction of an arrow.

B. The beveling 131 in each of the guide pipes 126 and the beveling 169 in the second connection frame block 165 are brought into contact with each other, so that the second connection frame block 165 rides over each of the guide pipes 126 by a height x.

C. With keeping this state, when the first connection frame block 125 and the second connection frame block 165 are respectively moved in a direction of an arrow, the position of each of the guide pipes 126 and the position of each of the guide holes 166 coincide, so that they become a connecting state.

D. Each of the fixing screws 132 is inserted from the first connection frame block 125 into each of the guide pipes 126, each of the fixing screw through holes 127, and each of the guide holes 166 so as to be fastened to each of the fixing screw holes 167.

Figure 36A:
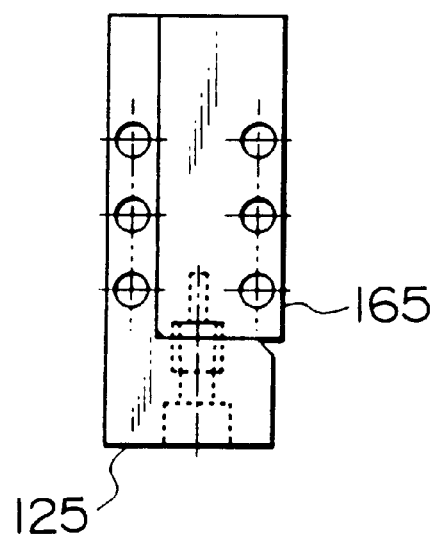
FIG. 36A is a front view of a state that a connection between the first connection frame block and the second connection frame block has completed in the connection frame block structure in accordance with the seventh embodiment of the invention.
Figure 36B:
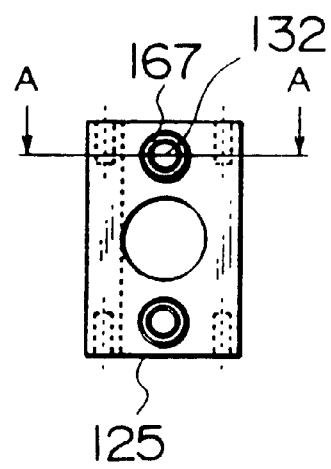
FIG. 36B is a bottom view of a state a connection between the first connection frame block and the second connection frame block has completed in the connection frame block structure in accordance with the seventh embodiment of the invention.
Figure 36C:
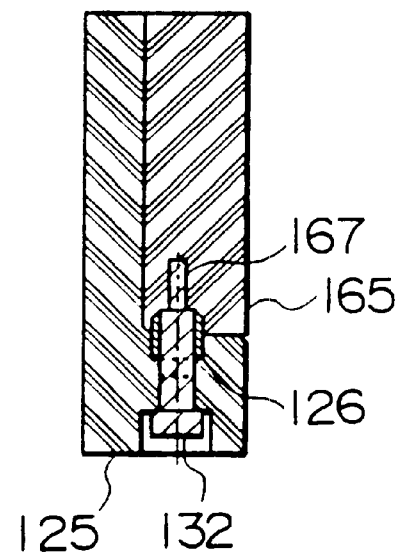
FIG. 36C is a sectional view along a line A—A in FIG. 36B.

A connection between the first connection frame block 125 and the second connection frame block 165 is completed in the above manner, thereby reaching a state shown in FIGS. 36A to 36C.

As is apparent from the description mentioned above, in accordance with the seventh embodiment, the following effects can be obtained.

1. Two guide pipes and two fixing screw through holes are coaxially provided in one of the connection frame blocks and two guide holes and two fixing screw holes are coaxially provided in the other of the connection frame blocks, respectively, thereby fastening by two fixing screws, so that both of the connection frame blocks can be made compact.

2. In other words, in case that sizes of both connection frame blocks are the same as sizes of both conventional connection frame block, the apparatus can stand against a great load by making two respective guide pipes, fixing screw holes, and fixing screws large.

What is claimed is:

1. A connection frame block structure comprising:

a first connection frame block in which two guide pipes having beveling in each of the front ends thereof and two fixing screw through holes coaxial with said two guide pipes are provided;

a second connection frame block in which two guide holes and two fixing screw holes coaxial with said two guide holes are provided, said second connection frame block having a connection starting surface, and a beveling provided at a corner of said connection starting surface between said second connection frame block and each of front ends of said two guide pipes; and two fixing screws;

wherein said beveling in each of said two guide pipes and said beveling in said connection frame block are brought into contact with each other in a first direction;

wherein said two fixing screws are respectively inserted into said two guide pipes, said two fixing screw through holes and said two guide holes in a second direction substantially normal to said first direction so as to be fastened to said two fixing screw holes.

* * * * *